US010158413B2

(12) United States Patent
Moon et al.

(10) Patent No.: US 10,158,413 B2
(45) Date of Patent: Dec. 18, 2018

(54) UPLINK SOUNDING FOR WLAN SYSTEM

(71) Applicant: NEWRACOM, INC., Irvine, CA (US)

(72) Inventors: Sungho Moon, Irvine, CA (US); Young Hoon Kwon, Laguna Niguel, CA (US); Daewon Lee, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 111 days.

(21) Appl. No.: 15/149,025

(22) Filed: May 6, 2016

(65) Prior Publication Data

US 2016/0330732 A1 Nov. 10, 2016

Related U.S. Application Data

(60) Provisional application No. 62/159,174, filed on May 8, 2015, provisional application No. 62/167,780, filed
(Continued)

(51) Int. Cl.
*H04W 72/04* (2009.01)
*H04B 7/06* (2006.01)
(Continued)

(52) U.S. Cl.
CPC ......... *H04B 7/0639* (2013.01); *H04B 7/0617* (2013.01); *H04B 7/0619* (2013.01); *H04W 16/28* (2013.01); *H04W 84/12* (2013.01)

(58) Field of Classification Search
CPC .............. H04W 72/0413; H04W 84/12; H04B 7/0404; H04B 7/0617; H04B 7/0639
See application file for complete search history.

(56) References Cited

U.S. PATENT DOCUMENTS

2008/0075058 A1\* 3/2008 Mundarath ............ H04B 7/043
370/342
2014/0233551 A1\* 8/2014 Wentink ................ H04L 1/1621
370/338
(Continued)

OTHER PUBLICATIONS

LAN/MAN Standards Committee of the IEEE Computer Society, "IEEE P802,11ah ™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
(Continued)

*Primary Examiner* — Charles C Jiang
*Assistant Examiner* — Thad N Defauw
(74) *Attorney, Agent, or Firm* — Morgan, Lewis & Bockius LLP

(57) ABSTRACT

In wireless communications, an access point may transmit a first frame to one or more stations. In response to the first frame, the station(s) may transmit a respective second frame to the access point. The access point may generate a beamforming report based on the second frame(s) received by the access point from the station(s). The access point may transmit a third frame(s) that includes the beamforming report to the station(s). The station(s) may generate a respective beamforming matrix based at least on the third frame(s). Other methods, apparatus, and computer-readable media are also disclosed.

20 Claims, 32 Drawing Sheets

Related U.S. Application Data on May 28, 2015, provisional application No. 62/245,776, filed on Oct. 23, 2015, provisional application No. 62/250,346, filed on Nov. 3, 2015, provisional application No. 62/215,594, filed on Nov. 5, 2015.

(51) Int. Cl.
*H04B 7/04* (2017.01)
*H04W 84/12* (2009.01)
*H04W 16/28* (2009.01)

(56) References Cited

U.S. PATENT DOCUMENTS

| | | | | |
|---|---|---|---|---|
| 2014/0247746 | A1* | 9/2014 | You | H04W 48/16 370/252 |
| 2017/0127440 | A1* | 5/2017 | Chun | H04W 72/1284 |
| 2017/0170937 | A1* | 6/2017 | Chun | H04L 5/0048 |
| 2017/0294953 | A1* | 10/2017 | Ghosh | H04B 7/0851 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

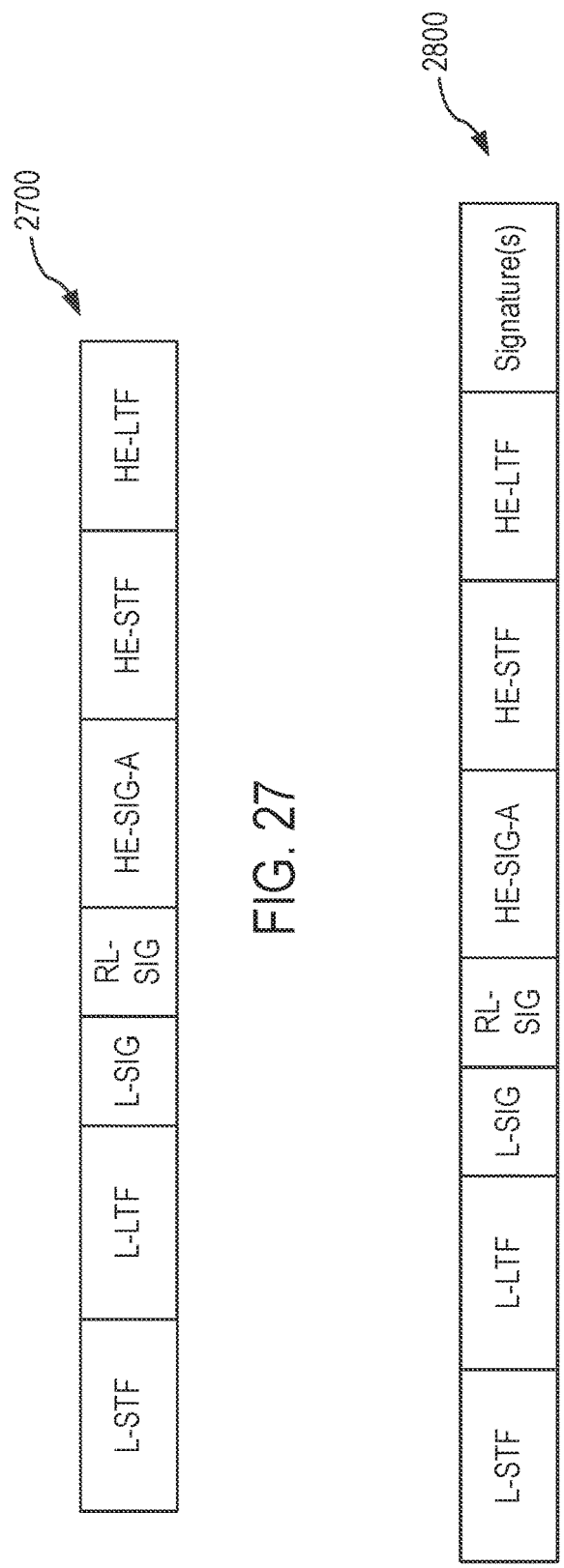

UPLINK SOUNDING FOR WLAN SYSTEM

CROSS-REFERENCE TO RELATED APPLICATIONS

This application claims the benefit of priority from U.S. Provisional Application No. 62/159,174, entitled "UPLINK SOUNDING IN UL OFDMA FOR HE WLAN," filed May 8, 2015; U.S. Provisional Application No. 62/167,780, entitled "UPLINK SOUNDING IN UL OFDMA FOR HE WLAN," filed May 28, 2015; U.S. Provisional Application No. 62/245,776, entitled "UPLINK SOUNDING IN UL OFDMA FOR HE WLAN," filed Oct. 23, 2015; U.S. Provisional Application No. 62/250,346, entitled "UPLINK SOUNDING IN UL OFDMA FOR HE WLAN," filed Nov. 3, 2015; and U.S. Provisional Application No. 62/251,594, entitled "UPLINK SOUNDING IN UL OFDMA FOR HE WLAN," filed Nov. 5, 2015, all of which are incorporated herein by reference in their entirety.

TECHNICAL FIELD

The present description relates in general to wireless communication systems and methods, and more particularly to, for example, without limitation, uplink sounding for wireless local area network (WLAN) systems.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIGS. 27 and 28 illustrate examples of non-data packet frames.

Figure 1:
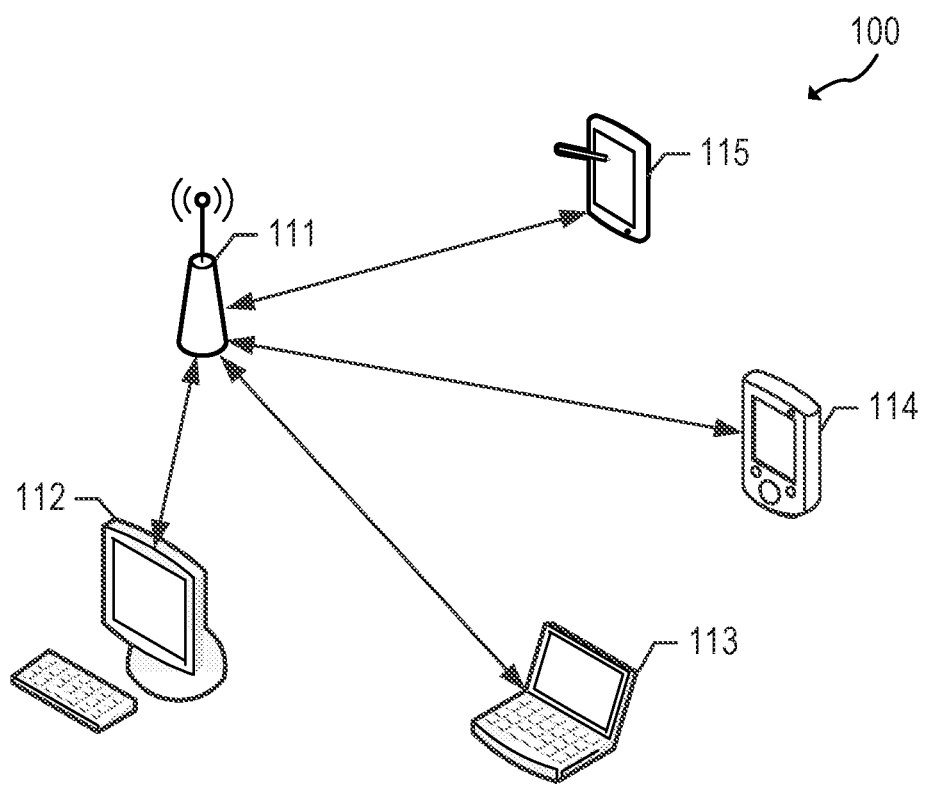
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In one or more implementations, the subject technology may support an uplink (UL) sounding protocol. The UL sounding protocol may involve a beamformee and one or more beamformers. In a case with more than one beamformer, the UL sounding protocol may be referred to as a UL multi-user (MU) sounding protocol. In some aspects, the beamformee may be an access point (AP), and the beamformers may be stations (e.g., non-AP stations). In some aspects, the UL MU sounding protocol may be utilized with UL MU transmission technology such as UL MU orthogonal frequency division multiple access (OFDMA) and/or UL MU multi-input multi-output (MIMO). The subject technology may support non-data packet (NDP) sounding, in which NDP frames are utilized in the UL sounding protocol. The UL sounding protocol may be utilized in high efficiency (HE) WLAN.

The UL sounding protocol may allow one or more beamformers to request and retrieve beamforming information from a beamformee and compute a beamforming matrix based on beamforming information fed back by the beamformee to the beamformers. The beamforming information may be referred to as beamforming report information or beamforming feedback information and may include signal-to-noise ratio (SNR) and/or beamforming feedback vector/matrix information. The beamformers may utilize the beamforming information to generate a beamforming matrix and generate beamformed data packets (using the beamforming matrix) to be transmitted to the beamformee. When the beamformee is an AP, the beamformed data packets may contain UL data that is transmitted uplink to the AP and received by the AP. In some aspects, beamformees may compress their respective feedback matrices to reduce overhead associated with the UL sounding protocol. Such feedback matrices may be referred to as compressed feedback matrices.

In one or more aspects, UL MU operation may allow the beamformee to solicit (e.g., using a trigger frame) response frames from the beamformers (e.g., immediate simultaneous response frames from the beamformers). For simultaneous response frames, the beamformers may transmit their response frames using UL MU transmission technology (e.g., UL MU OFDMA and/or UL MU-MIMO).

A trigger frame may be a frame sent by an AP that seeks data, control, or management frame response(s) from stations that participate in a subsequent UL MU frame. The trigger frame may be utilized to initiate the simultaneous MU transmission in OFDMA. In an aspect, a trigger frame may include, for example, some or all of the following features: (a) a list of stations (STAs) that an access point (AP) seeks a response from; (b) resource allocation information for each STA (e.g., a subband assigned to each STA); and/or (c) attributes of the expected UL MU frame, such as the duration, bandwidth, etc., among other features. In other words, the trigger frame may be used to allocate resource for UL MU transmission and to solicit an UL MU transmission from the participating stations in response to the trigger frame. The term "resource" may refer to, for example, a bandwidth (e.g., a subband(s), frequencies, frequency band(s)), time/duration that the STAs expect to occupy a transmission medium, and/or possibly a number of spatial streams that the STAs may use.

The beamforming feedback vector/matrix computed by the beamformee may be referred to as a beamforming feedback matrix or a feedback matrix for simplicity. The feedback matrix may be represented as a V matrix. The beamforming vector/matrix computed by the beamformer may be referred to as a beamforming matrix for simplicity. The beamforming matrix may also be referred to as a steering matrix or pre-coding matrix and may be represented as a Q matrix. In one aspect, the beamforming matrix and feedback matrix may change from tone to tone. A tone may be referred to as subcarrier. Each tone may be associated with or otherwise identified by a tone index or a subcarrier index. A tone index may be referred to as a subcarrier index.

A sounding protocol may be referred to as a sounding procedure, sounding feedback sequence, sounding protocol sequence, channel sounding protocol, channel measurement protocol, channel calibration protocol, channel state information (CSI) sounding protocol, beamforming protocol, channel calibration protocol, or variants thereof (e.g., CSI feedback sequence).

In one or more implementations, the UL sounding protocol may be utilized in OFDMA communication. In OFDMA, feedback information (e.g., average SNR values) in the unit of subband may be helpful. The unit of subband may be a portion of a channel bandwidth. In an aspect, the unit of subband may include, without limitation, 26 tones, 52 tones, 106 tones, 242 tones, and 484 tones. In an aspect, a respective average SNR value computed over each subband may be provided by the beamformee to the beamformer. In an aspect, when the beamformee is the AP and the beamformer(s) are the station(s), the AP may allocate subbands to the beamformer(s) and provide respective feedback information for each allocated subband to the beamformer(s).

In one or more implementations, the subject technology may provide subband-wise non-data packet announcement (NDPA or NDP-A) schemes and relevant feedback methods. In some aspects, modifications and/or additions to the very high throughput (VHT) sounding protocol utilized in the Institute of Electrical and Electronics Engineers (IEEE) 802.11ac standard may be implemented to facilitate NDP sounding in OFDMA communication. In this regard, in some aspects, modifications and/or additions may be made with respect to NDPA frames and/or feedback report frames utilized in IEEE 802.11ac.

One or more implementations of the subject technology may allow reduction in the number of NDPA transmissions, reduction in the number of NDP transmissions, and/or reduction of contention periods between sounding procedures. One or more aspects of the subject technology may allow utilizing downlink (DL) OFDMA for an NDPA frame, sending NDPA and NDP frames together, and/or combining a trigger frame with beamforming information. In one or more aspects, the subject technology may allow sending feedback in OFDMA. In case of UL MU OFDMA, the UL sounding protocol may be utilized in HE WLAN.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 2:
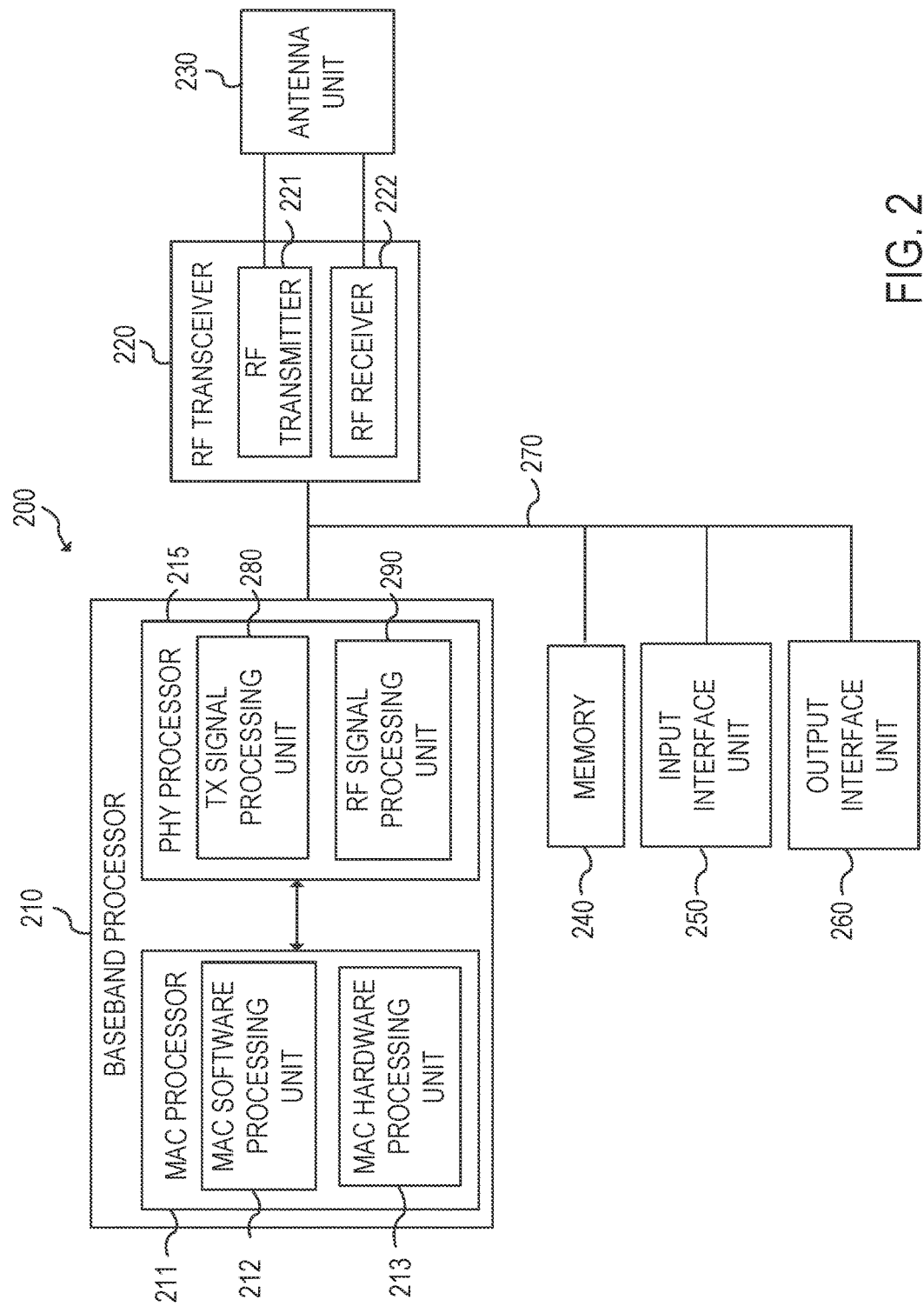
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers, and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
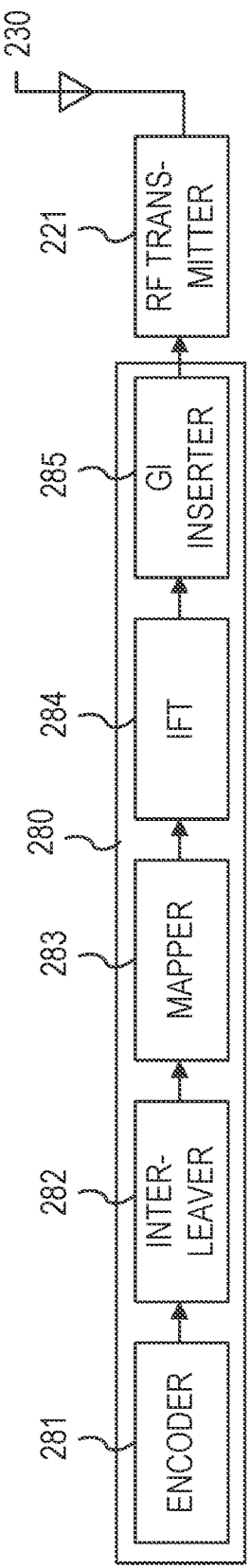
FIG. 3A illustrates a schematic block diagram of an example of a transmitting signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams (NSTS) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
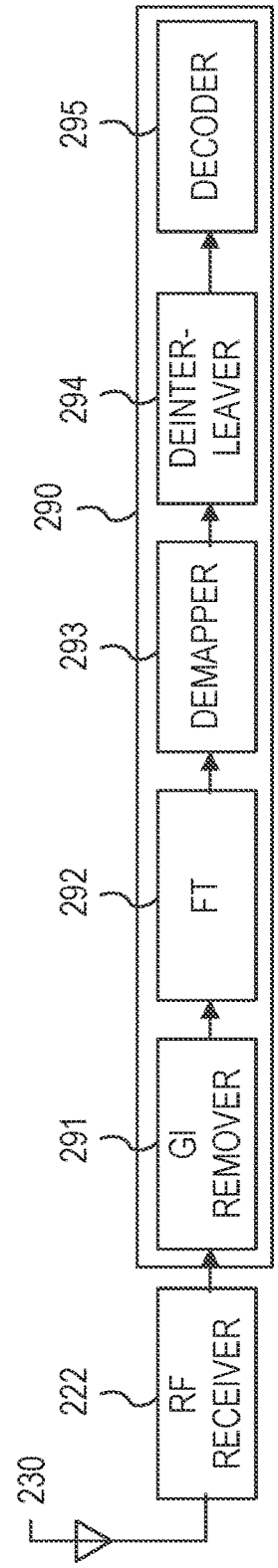
FIG. 3B illustrates a schematic block diagram of an example of a receiving signal processor in a wireless communication device.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
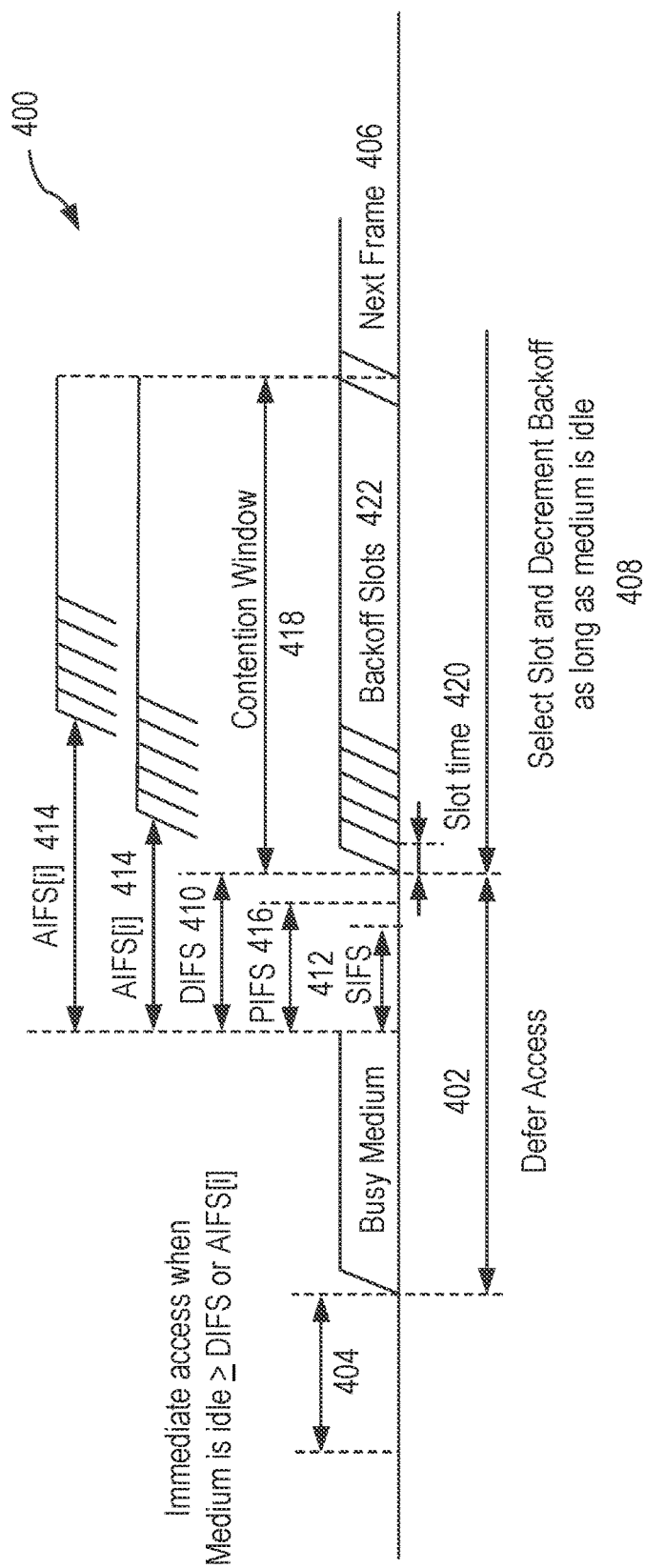
FIG. 4 illustrates an example of a timing diagram of interframe space (IFS) relationships.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
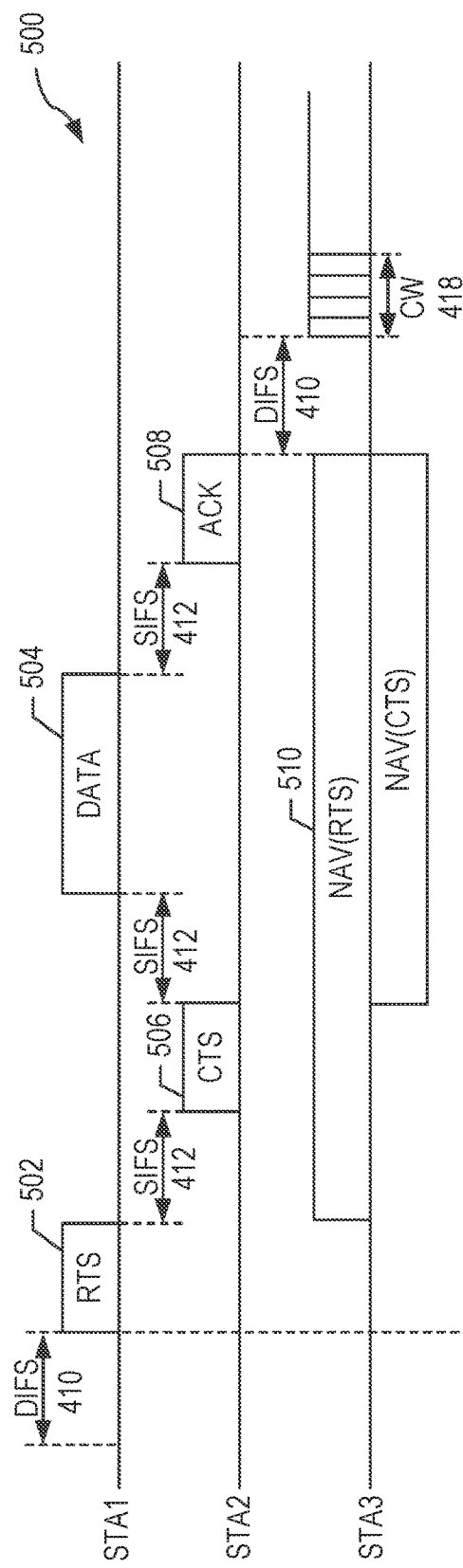
FIG. 5 illustrates an example of a timing diagram of a carrier sense multiple access/collision avoidance (CSMA/CA) based frame transmission procedure for avoiding collision between frames in a channel.

FIG. 5 illustrates an example of a timing diagram 500 of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) is busy by carrier sensing. The STA1 may determine the channel occupation based on an energy level on the channel or correlation of signals in the channel. In one or more implementations, the STA1 determines the channel occupation by using a network allocation vector (NAV) timer.

When determining that the channel is not used by other devices during the DIFS 410 (e.g., the channel is idle), the STA1 may transmit an RTS frame 502 to the STA2 after performing backoff. Upon receiving the RTS frame 502, the STA2 may transmit a CTS frame 506 as a response of the CTS frame 506 after the SIFS 412.

When the STA3 receives the RTS frame 502, the STA3 may set a NAV timer for a transmission duration representing the propagation delay of subsequently transmitted frames by using duration information involved with the transmission of the RTS frame 502 (e.g., NAV(RTS) 510). For example, the STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, the STA3 may update the NAV timer by using duration information included in the new frame. The STA3 does not attempt to access the channel until the NAV timer expires.

When the STA1 receives the CTS frame 506 from the STA2, the STA1 may transmit the data frame 504 to the STA2 after the SIFS 412 elapses from a time when the CTS frame 506 has been completely received. Upon successfully receiving the data frame 504, the STA2 may transmit the ACK frame 508 after the SIFS 412 elapses as an acknowledgment of receiving the data frame 504.

When the NAV timer expires, the STA3 may determine whether the channel is busy by the carrier sensing. Upon determining that the channel is not used by the other WLAN devices (e.g., STA1, STA2) during the DIFS 410 after the NAV timer has expired, the STA3 may attempt the channel access after a contention window 418 has elapsed. In this example, the contention window 418 may be based on a random backoff.

Figure 6:
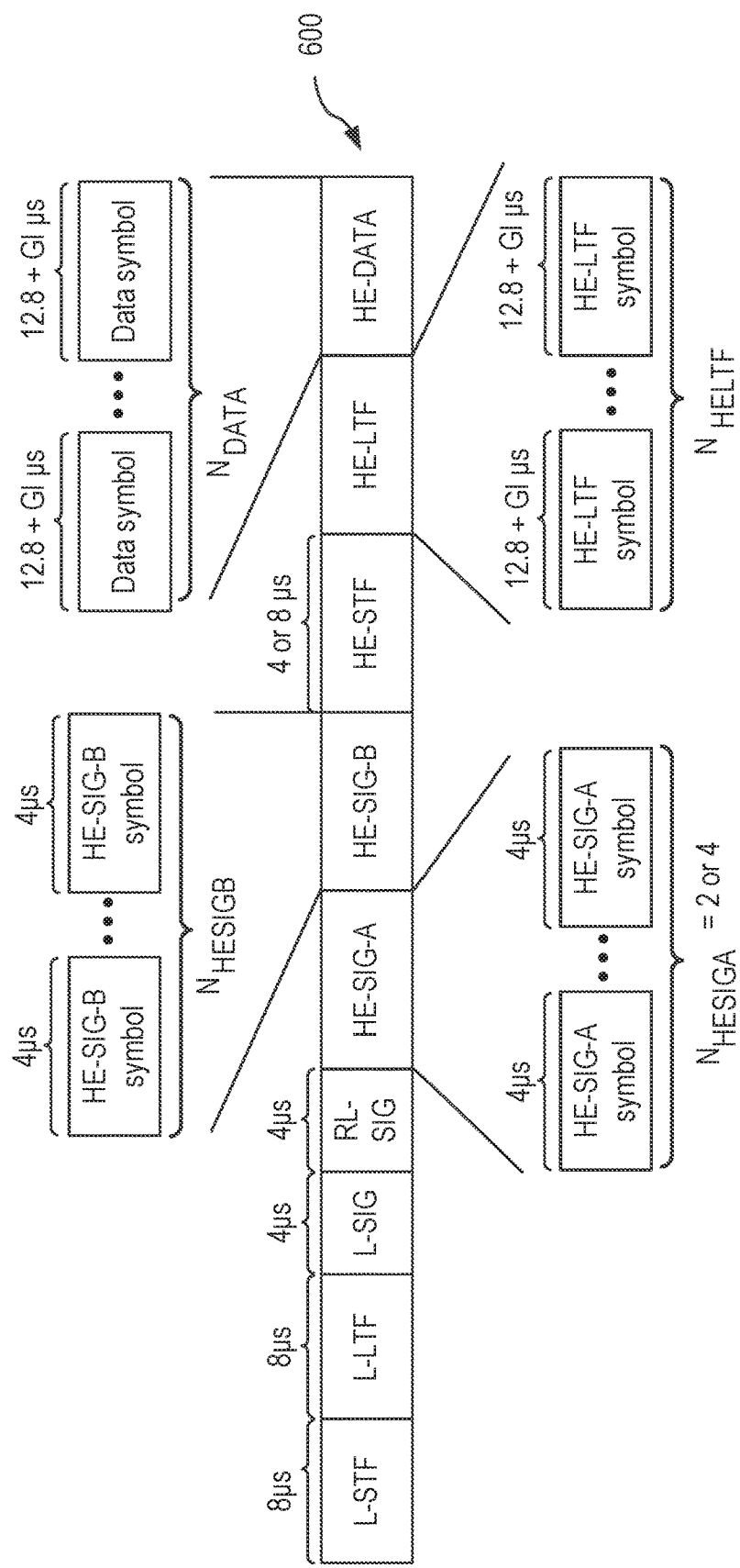
FIG. 6 illustrates an example of a high efficiency (HE) frame.

FIG. 6 illustrates an example of a high efficiency (HE) frame 600. The HE frame 600 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. A transmitting station (e.g., AP, non-AP station) may generate the HE frame 600 and transmit the HE frame 600 to a receiving station. The receiving station may receive, detect, and process the HE frame 600. The HE frame 600 may include an L-STF field, an L-LTF field, an L-SIG field, an RL-SIG field, an HE-SIG-A field, an HE-SIG-B field, an HE-STF field, an HE-LTF field, and an HE-DATA field. The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols.

In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

Table 1, shown below, provides examples of characteristics associated with the various components of the HE frame 600.

TABLE 1

| | | | | | | |
|---|---|---|---|---|---|---|
| | | | | PPDU Frame | | |
| Element | Definition | Duration | DFT period | GI | Subcarrier Spacing | Description |
| Legacy(L)-STF | Non-high throughput (HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. Single user (SU) packets and UL Trigger based packets do not contain HE-SIG-B. |

TABLE 1-continued

| | | | | | | |
|---|---|---|---|---|---|---|
| | | | | PPDU Frame | | |
| Element | Definition | Duration | DFT period | GI | Subcarrier Spacing | Description |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is a UL PPDU sent in response to a trigger frame. |
| HE-LTF | HE Long Training field | $N_{HELTF}$ * (DFT period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU may support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ means the number of HE-LTF symbols and is equal to 1, 2, 4, 6, 8. |
| HE-DATA | HE DATA field | $N_{DATA}$ * (DTF period + GI) μs | 12.8 μs | supports 0.8, 1.6, 3.2 μs | 78.125 kHz | $N_{DATA}$ means the number of HE data symbols. |

Referring to FIG. 6, the HE frame 600 contains a header and a data field. The header includes a legacy header comprised of the legacy short training field (L-STF), the legacy long training field (L-LTF), and the legacy signal (L-SIG) field. These legacy fields contain symbols based on an early design of an IEEE 802.11 specification. Presence of these symbols may facilitate compatibility of new designs with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz (e.g., 40 MHz, 80 MHz, 160 MHz). Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. The L-LTF field may be utilized for channel estimation, fine frequency-offset correction, and symbol timing. In one or more aspects, the L-SIG field may contain information indicative of a data rate and a length (e.g., in bytes) associated with the HE frame 600, which may be utilized by a receiver of the HE frame 600 to calculate a time duration of a transmission of the HE frame 600.

The header may also include an HE header comprised of an HE-SIG-A field and an HE-SIG-B field. The HE header may be referred to as a non-legacy header. These fields contain symbols that carry control information associated with each PLCP service data unit (PSDU) and/or radio frequency (RF), PHY, and MAC properties of a PPDU. In one aspect, the HE-SIG-A field can be carried/modulated using an FFT size of 64 on a 20 MHz basis. The HE-SIG-B field can be carried/modulated using an FFT size of e.g., 64 or 256 on a 20 MHz basis depending on implementation. The HE-SIG-A and HE-SIG-B fields may occupy the entire channel bandwidth of the frame. In some aspects, the size of the HE-SIG-A field and/or the HE-SIG-B field is variable (e.g., can vary from frame to frame). In an aspect, the HE-SIG-B field is not always present in all frames. To facilitate decoding of the HE frame 600 by a receiver, the size of (e.g., number of symbols contained in) the HE-SIG-B field may be indicated in the HE-SIG-A field. In some aspects, the HE header also includes the repeated L-SIG (RL-SIG) field, whose content is the same as the L-SIG field.

The HE header may further include HE-STF and HE-LTF fields, which contain symbols used to perform necessary RF and PHY processing for each PSDU and/or for the whole PPDU. The HE-LTF symbols may be modulated/carried with an FFT size of 256 for 20 MHz bandwidth and modulated over the entire bandwidth of the frame. Thus, the HE-LTF field may occupy the entire channel bandwidth of the frame. In one aspect, the HE-LTF field may occupy less than the entire channel bandwidth. In one aspect, an HE-LTF sequence may be utilized by a receiver to estimate MIMO channel between the transmitter and the receiver. Channel estimation may be utilized to decode data transmitted and compensate for channel properties (e.g., effects, distortions). For example, when a preamble is transmitted through a wireless channel, various distortions may occur, and a training sequence in the HE-LTF field is useful to reverse the distortion. This may be referred to as equalization. To accomplish this, the amount of channel distortion is measured. This may be referred to as channel estimation. In one aspect, channel estimation is performed using an HE-LTF sequence, and the channel estimation may be applied to other fields that follow the HE-LTF sequence.

The HE-STF symbols may have a fixed pattern and a fixed duration. For example, the HE-STF symbols may have a predetermined repeating pattern. In one aspect, the HE-STF symbols do not require FFT processing. The HE frame 600 may include the data field, represented as HE-DATA, that contains data symbols. The data field may also be referred to as a payload field, data, payload or PSDU.

In one or more aspects, additional one or more HE-LTF fields may be included in the header. For example, an additional HE-LTF field may be located after a first HE-LTF field. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

In one or more implementations, the subject technology supports sounding protocols that include non-data packet (NDP) sounding and and/or explicit feedback from a beamformee to a beamformer. The NDP sounding may involve the exchanging between the beamformee and beamformer(s) of non-data packet announcement (NDPA) frame(s), NDP frame(s), NDPA poll frame(s), NDP poll frames, and/or beamforming report frame(s).

The non-data packet frame may be referred to as a null data packet frame. The non-data packet announcement frame may be referred to as a null data packet announcement frame. A sounding protocol that utilizes NDPA frames and NDP frames may be referred to as an NDP sounding protocol or NDP-based sounding protocol.

Figure 7:
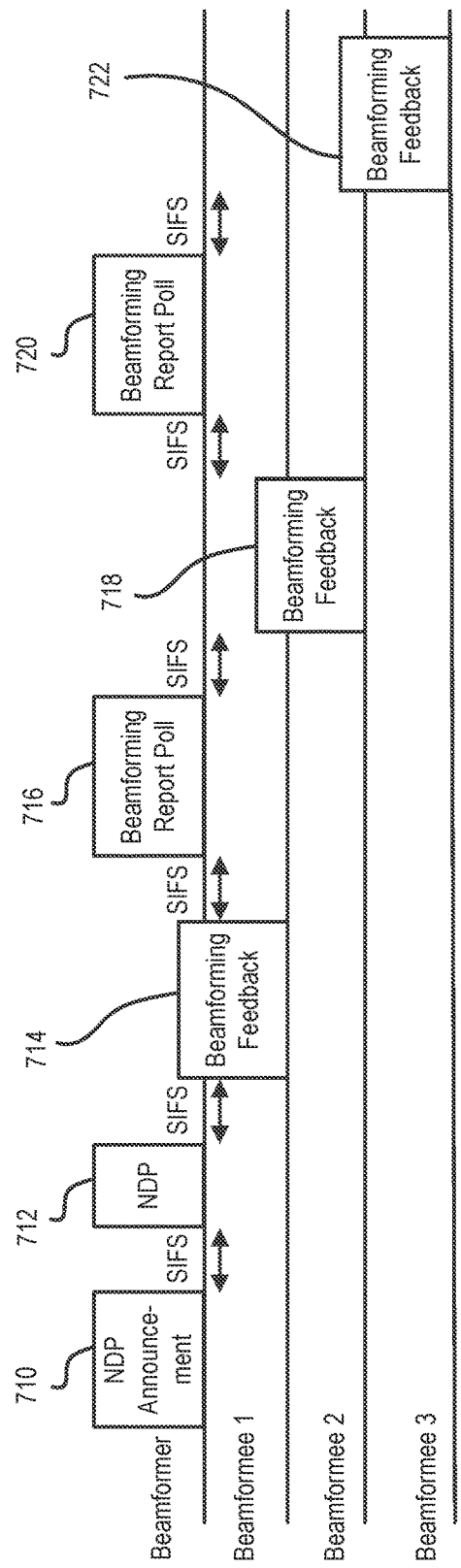
FIG. 7 illustrates an example of a sounding protocol.

FIG. 7 illustrates an example of a sounding protocol. Although FIG. 7 illustrates an example of a sounding protocol with multiple beamformees, the sounding protocol may involve one beamformer and one beamformee in some cases.

The beamformer may initiate the sounding protocol by sending an NDPA frame 710 followed by an NDP frame 712. The NDPA frame 710 may be utilized by the beamformer to identify the beamformees being included by the beamformer in the sounding protocol and indicate to these beamformees that the beamformer requests (e.g., expects) them to prepare (e.g., measure, generate) beamforming information to be fed back to the beamformer. In an aspect, if the AP is requesting and receiving beamforming information from the stations, the sounding protocol may be referred to as a DL sounding protocol.

The NDPA frame 710 may include one or more fields to identify the beamformees. In some aspects, the NDPA frame 710 may include one Station Information (STA Info) field for each beamformee. The NDPA frame 710 may include a STA Info 1 field, STA Info 2 field, and STA Info 3 field that are associated with beamformees 1, 2, and 3, respectively. Each STA Info field may include an Association Identifier (AID) field that identifies a respective beamformee. An example of an NDPA frame will be described further below with respect to FIG. 8.

The NDPA frame 710 is generally immediately followed by the NDP frame 712. Upon receipt of the NDP frame 712, each of the beamformees identified in the NDPA frame 710 may generate beamforming information (e.g., average SNR value(s), feedback matrix/matrices) based on the NDP frame 712. In some aspects, the NDP frame 712 may be the HE frame 600, except without the HE-DATA field or with an empty HE-DATA field. For example, the NDP frame 712 may include only the header (e.g., the legacy and HE headers) of the HE frame 600. In some aspects, the beamformees may compute feedback matrices and/or SNR values based on the NDP frame 712. The beamforming information may be based on analysis of, for example, the training fields (e.g., L-STF, L-LTF, HE-STF, HE-LTF) contained in the NDP frame 712. For example, the beamformees may perform measurements (e.g., power measurements) on the NDP frame 712 at various tones.

In response to the NDPA frame 710, beamformee 1 may transmit a beamforming feedback frame 714. The beamforming feedback frame 714 includes beamforming information generated by beamformee 1. To retrieve the beamforming information from the remaining beamformees, the beamformer may transmit a beamforming report poll frame 716, whose intended recipient may be designated in a Receiver Address (RA) field of the beamforming report poll frame 716. The intended recipient of the beamforming report poll frame 716 is the beamformee whose beamforming information is being requested by (e.g., retrieved by) the beamformer. When the beamforming report poll frame 716 identifies beamformee 2 in its RA field, beamformee 2 may transmit a beamforming feedback frame 718 to the beamformer in response to the beamforming report poll frame 716. The beamformer may transmit a beamforming report poll frame 720 whose RA field is designated as beamformee 3. Beamformee 3 may transmit a beamforming feedback frame 722 to the beamformer in response to the beamforming report poll frame 720. The beamforming feedback frames 718 and 722 contain the beamforming information generated by beamformees 2 and 3, respectively. An example of a beamforming feedback frame will be described further below with respect to FIG. 9.

In some aspects, beamformees may compress their respective beamforming information (e.g., feedback matrices) to reduce overhead associated with the sounding protocol. A beamforming feedback frame that contains compressed feedback matrices may be referred to as a compressed beamforming (CB) feedback frame. The compressed feedback matrices may be referred to as compressed V matrices and their elements may be referred to as compressed-V beamforming weights. In an aspect, the compression and/or format of the beamforming information may be indicated by the beamformer in the NDPA frame. The disclosure may refer to compressed versions of the beamforming information, feedback matrices, and the beamforming feedback frames for simplicity, although non-compressed versions of the beamforming information, feedback matrices, and beamforming feedback frames may be utilized.

In an aspect, as shown in FIG. 7, the beamformer may retrieve beamforming information in the order associated with the index of the STA Info field. For example, the beamformee associated with STA Info 1 field may transmit a beamforming report frame to the beamformer upon receipt of the NDP frame 712, while the remaining beamformees (e.g., beamformee 2 and beamformee 3) need to be polled prior to the remaining beamformees transmitting their respective beamforming report frames to the beamformer. In this regard, the beamforming report poll frame targets a specific beamformee. The remaining beamformees may be polled such that the beamformee associated with the STA Info 2 field is polled and then the beamformee associated with the STA Info 3 field is polled. Other manners by which the beamformer determines an order in which beamforming information is retrieved from the beamformees may be utilized.

Upon retrieving the beamforming information from the beamformees, the beamformer may generate a beamforming matrix to be utilized for generating beamformed data packets for beamformees 1, 2, and 3. In one aspect, the time period between any two adjacent frames 710, 712, 714, 716, 718, 720, and 722 may be a short interface space (SIFS). In one or more implementations, the frames 710, 712, 714, 716, 718, 720, and 722 illustrated in FIG. 7 may represent PPDUs. In some aspects, the frames 710, 714, 716, 718, 720, and 722 are Media Access Control (MAC) Protocol Data Units (MPDUs) (e.g., MAC frames). The MPDUs may be a payload(s) of a PPDU. The PPDU may have the format of the HE frame 600 shown in FIG. 6.

Figure 8:
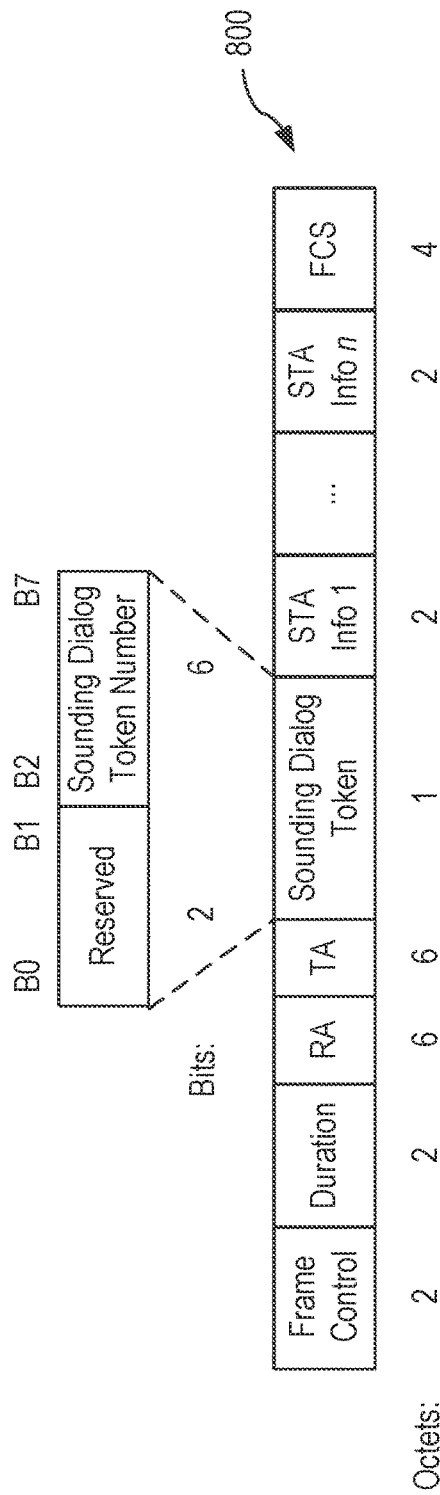
FIG. 8 illustrates an example of a non-data packet announcement frame.

FIG. 8 illustrates an example of an NDPA frame 800. In some aspects, the NDPA frame 710 of FIG. 7 may be, may include, or may be a part of, the NDPA frame 800. In some aspects, the NDPA frame 800 may be a MAC frame that forms at least a part of the payload of the HE frame 600. The NDPA frame 800 may include a Frame Control field. Duration field, Receiver Address (RA) field, Transmitter Address (TA) field. Sounding Dialog Token field, Station Information (STA Info) 1 field, STA Info n field, and Frame Check Sequence (FCS) field. It is noted that the ellipses between the STA Info 1 field and STA Info n field indicate that one or more additional STA Info fields or no STA Info fields are present between the STA Info 1 field and STA Info n field. Each STA Info field is associated with one station. Although the NDPA frame 800 includes at least a STA Info 1 field and a STA Info n field, an NDPA frame may include a single STA Info field.

In some aspects, the TA field may be set to the address of the transmitter of the NDPA frame 800. In some aspects, when the NDPA frame 800 includes more than one STA Info field, the RA field of the NDPA frame 800 may be set to a broadcast address. In some aspects, the broadcast address may be a MAC sublayer address. The broadcast address may be a distinguished, predefined group (e.g., multidestination) address that is utilized to denote a set of all stations on a given network (e.g., LAN). As an example, with reference to FIG. 8, the TA field may include the address of the beamformer, and the RA field may include a broadcast address associated with beamformees 1, 2, and 3. In some aspects (not shown), if an NDPA frame includes a single STA Info field, the RA field of the NDPA frame may be set to an address (e.g., MAC address) of the single beamformee associated with the single STA Info field.

The Sounding Dialog Token field may include reserved bits and a Sounding Dialog Token Number field. The Sounding Dialog Token Number field may contain a value selected by a beamformer to identify an NDPA frame.

Each STA Info field may include an Association Identifier (AID) field, a Feedback Type field, and an Nc Index field. The AID field in each STA Info field may contain an AID value that identifies a station. The identified station may be expected to process an NDP frame that follows the NDPA frame 800 to prepare sounding feedback based on the NDP frame. An AID field of the STA Info 1, STA Info 2, and STA Info 3 fields may be set to an AID value associated with beamformee 1, 2, and 3, respectively. In some aspects, the AID field may be referred to as the AID12 field, such as in the case that the AID field includes 12 bits (e.g., 12 least significant bits) of the AID value.

The Feedback Type field includes a value indicative of a type of feedback (e.g., SU-feedback, MU feedback) requested by the beamformer. In the MU feedback case, the Nc Index field may be used to indicate the number of columns in the compressed beamforming feedback matrix to be provided by the beamformee to the beamformer. In some aspects, in the SU feedback case, the Nc Index field is not used. The beamformees may generate beamforming information in accordance with the Feedback Type field and/or the Nc Index field of the NDPA frame 800.

Figure 9:
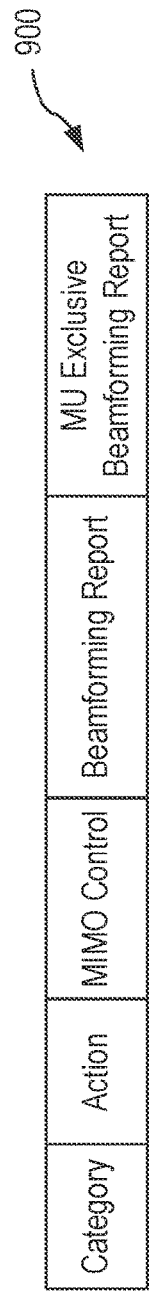
FIG. 9 illustrates an example of a beamforming feedback frame.

FIG. 9 illustrates an example of a beamforming feedback frame 900. The beamforming feedback frame may also be referred to as a beamforming feedback report frame, beamforming report frame, or report frame. The beamforming feedback frame 900 may be a MAC frame. In an aspect, the beamforming feedback frame 900 may be a payload of the HE frame 600. The beamforming feedback frame 900 may be a compressed beamforming feedback frame (e.g., when beamforming information contained in the beamforming feedback frame 900 is compressed). The beamforming feedback frame 900 may be any one of beamforming feedback frames 714, 718, and 722.

The beamforming feedback frame 900 includes a Category field, Action field, MIMO Control field, Beamforming Report field, and MU Exclusive Beamforming Report field. In an aspect, the MIMO Control field may be considered a header or portion thereof of the beamforming feedback frame 900 whereas the Beamforming Report field and the MU Exclusive Beamforming Report field may be considered a payload or portion thereof of the beamforming feedback frame. The MIMO Control field may contain information indicative of the format of the Beamforming Report field and the MU Exclusive Beamforming Report field.

In a non-MU case (e.g., SU case), the beamforming feedback frame does not include the MU Exclusive Beamforming Report field. In some aspects, the Beamforming Report field may be referred to as a Compressed Beamforming Report field and used to include compressed beamforming information. The Beamforming Report field may contain SU feedback information or MU feedback information depending on the Feedback Type field of the NDPA frame (e.g., 800 in FIG. 8) from the beamformer. A portion of the Beamforming Report field may include average SNR values and another portion of the Beamforming Report field may include beamforming feedback matrices. The beamformer can calculate a beamforming matrix Q based on the SU and/or MU feedback information.

In an aspect, if the feedback type is SU, the Beamforming Report field may contain the average SNR values over all reported data subcarriers of space-time (ST) streams from 1 to Nc. An example of beamforming report information included in the Beamforming Report field is illustrated in Table 2. In this regard, Table 2 provides an example of an order in which information is provided in the Beamforming Report field. For example, in the Beamforming Report field, an "Average SNR of Space-Time Stream 1" field may be followed by an "Average SNR of Space-Time Stream 2" field. In an aspect, Table 2 illustrates VHT compressed beamforming report information.

TABLE 2

Example of Compressed Beamforming Report information

| Field | Size (bits) | Meaning |
|---|---|---|
| Average SNR of Space-Time Stream 1 | 8 | Signal-to-noise ratio at the beamformee for space-time stream 1 averaged over all data subcarriers. See Table 8-53h (Average SNR of Space-Time Stream i subfield). |
| ... | ... | ... |
| Average SNR of Space-Time Stream Nc | 8 | Signal-to-noise ratio at the beamformee for space-time stream Nc averaged over all data subcarriers. See Table 8-53h (Average SNR of Space-Time Stream i subfield). |
| Compressed Beamforming Feedback Matrix V for subcarrier k = scidx(0) | Na × ($b_\psi$ + $b_\phi$)/2 | Compressed beamforming feedback matrix as defined in Table 8-53d (Order of angles in the Compressed Beamforming Feedback Matrix subfield) and Table 8-53e (Quantization of angles). |
| Compressed Beamforming Feedback Matrix V for subcarrier k = scidx(1) | Na × ($b_\psi$ + $b_\phi$)/2 | Compressed beamforming feedback matrix as defined in Table 8-53d (Order of angles in the Compressed Beamforming Feedback Matrix subfield) and Table 8-53e (Quantization of angles). |
| Compressed Beamforming Feedback Matrix V for subcarrier k = scidx(2) | Na × ($b_\psi$ + $b_\phi$)/2 | Compressed beamforming feedback matrix as defined in Table 8-53d (Order of angles in the Compressed Beamforming Feedback Matrix subfield) and Table 8-53e (Quantization of angles). |
| ... | ... | ... |
| Compressed Beamforming Feedback Matrix V for subcarrier k = scidx(Ns − 1) | Na × ($b_\psi$ + $b_\phi$)/2 | Compressed beamforming feedback matrix as defined in Table 8-53d (Order of angles in the Compressed Beamforming Feedback Matrix subfield) and Table 8-53e (Quantization of angles). |

NOTE
scidx( ) is defined in Table 8-53g (Subcarriers for which a Compressed Beamforming Feedback Matrix subfield is sent back)

In an aspect, if the feedback type is MU, the beamforming feedback frame 900 may include additional beamforming report information on top of the information provided for SU feedback (e.g., in the Beamforming Report field). The additional beamforming report information may include delta SNR (ΔSNR) for space-time stream from 1 to Nc for each reported subcarrier. Table 3 illustrates an example of MU Exclusive Beamforming Report information. In this regard, Table 3 provides an example of an order in which information is provided in the MU Exclusive Beamforming Report field.

TABLE 3

Example of MU Exclusive Beamforming Report information

| Field | Size (Bits) | Meaning |
|---|---|---|
| Delta SNR for space-time stream 1 for subcarrier k = sscidx(0) | 4 | $\Delta SNR_{sscidx(0), 1}$ |
| ... | ... | ... |
| Delta SNR for space-time stream Nc for subcarrier k = sscidx(0) | 4 | $\Delta SNR_{sscidx(0), Nc}$ |
| Delta SNR for space-time stream 1 for subcarrier k = sscidx(1) | 4 | $\Delta SNR_{sscidx(1), 1}$ |
| ... | ... | ... |
| Delta SNR for space-time stream Nc for subcarrier k = sscidx(1) | 4 | $\Delta SNR_{sscidx(1), Nc}$ |
| ... | ... | ... |
| Delta SNR for space-time stream 1 for subcarrier k = sscidx(Ns' − 1) | 4 | $\Delta SNR_{sscidx(Ns'-1), 1}$ |
| ... | ... | ... |
| Delta SNR for space-time stream Nc for subcarrier k = sscidx(Ns' − 1) | 4 | $\Delta SNR_{sscidx(1), Nc}$ |

NOTE
sscidx( ) is defined in Table 8-53j (Number of subcarriers and subcarrier mapping).

In an aspect, an example of the various variables in Table 3 is provided as follows:

$$\Delta SNR_{k,i} = \min\left(\max\left(\text{round}\left(10\log_{10}\left(\frac{\|H_k V_{k,i}\|^2}{N}\right) - \overline{SNR_i}\right), -8\right), 7\right)$$

where
k is the subcarrier index in the range of sscidx(0), . . . , sscidx(Ns'−1);
i is the space-time stream index in the range of 1, . . . , Nc;
$H_k$ is the estimated MIMO channel for subcarrier k;
$V_{k,i}$ is column i of the beamforming matrix V for subcarrier k;
N is the average noise plus interference power, measured at the beamformee, that was used to calculate $\overline{SNR_i}$; and
$\overline{SNR_i}$ is the average SNR of space-time stream i reported in the Compressed Beamforming Report information (Average SNR in Space-Time Stream i field).

It is noted that the ellipses in Tables 2 and 3 may indicate that one or more additional fields or no additional fields are present between fields adjacent to the ellipses.

In one or more implementations, the subject technology may support a UL MU sounding protocol to facilitate UL MU transmission (e.g., UL MU OFDMA transmission, UL MU-MIMO transmission). In some aspects, the UL MU transmission may involve multiple beamformers (STAs) and a single beamformee (AP). Each of the multiple stations involved in the UL MU transmission may utilize channel information obtained from the UL sounding protocol to determine and apply beamforming for its UL MU transmission to the AP. In an aspect, one or more stations may request that a sounding protocol be initiated between the AP and stations. As used herein, for UL MU sounding protocols, the term beamformers may be used interchangeably with stations (e.g., non-AP stations) and the term beamformee may be used interchangeably with an AP.

Figure 10:
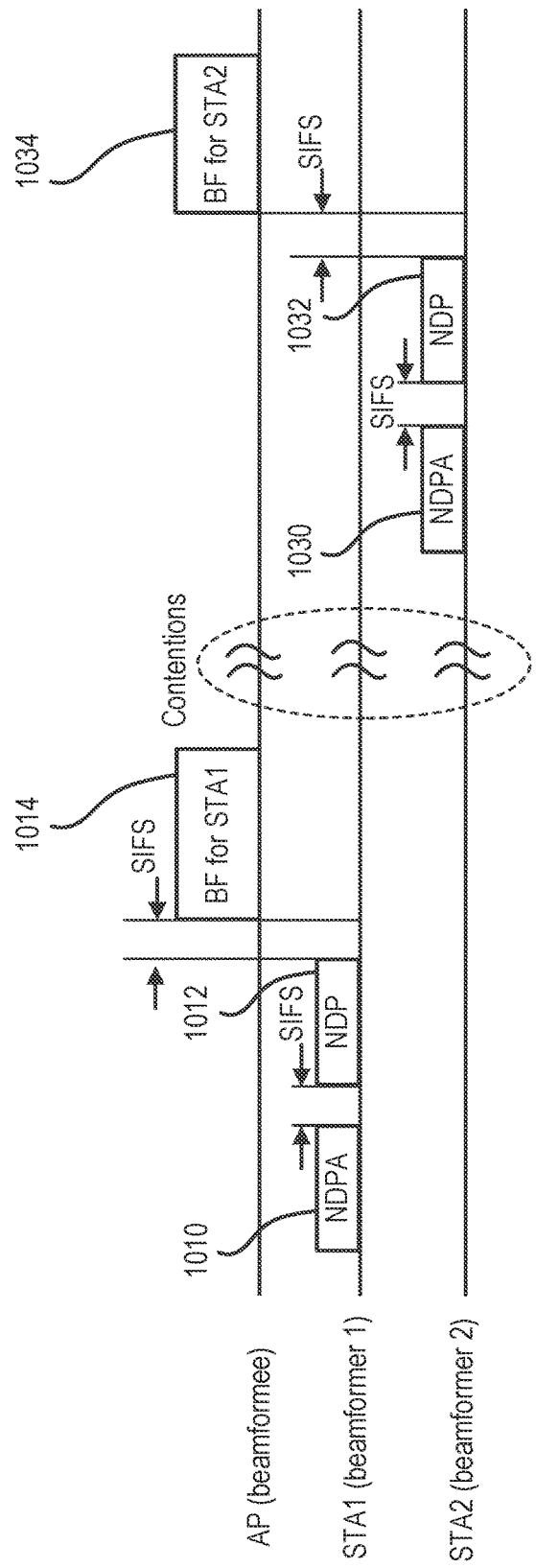
FIG. 10 illustrates an example of an uplink (UL) sounding protocol.

FIG. 10 illustrates an example of a UL sounding protocol. In FIG. 10, the sounding protocol involves one beamformee and two beamformers, where the beamformee is an AP and the two beamformers are stations (e.g., STA1, STA2). The description from FIG. 7 generally applies to FIG. 10, with examples of differences between FIG. 7 and FIG. 10 and other description provided herein for purposes of clarity and simplicity.

STA may transmit an NDPA frame 1010 followed by an NDP frame 1012 to the AP to request beamforming information (e.g., UL channel information) associated with a channel between STA1 and the AP. Upon receipt of the NDP frame 1012, the AP may generate beamforming information based on the NDP frame 1012 and transmit to STA1 a beamforming feedback (BF) frame 1014 that contains the beamforming information.

Similarly, STA2 may transmit an NDPA frame 1030 followed by an NDP frame 1032 to the AP to request beamforming information associated with a channel between STA2 and the AP. Upon receipt of the NDP frame 1032, the AP may generate beamforming information based on the NDP frame 1032 and transmit to STA2 a beamforming feedback (BF) frame 1034 that contains the beamforming information. In an aspect, the NDPA frames 1010 and 1030 may identify the AP (e.g., in the AID field).

In an aspect, the UL sounding protocol of FIG. 10 may be considered as two separate UL sounding protocols (e.g., one between STA1 and AP and another between STA2 and AP). Each of the two UL sounding protocols is associated with an NDPA frame (e.g., 1010, 1030), an NDP frame (e.g., 1012, 1032), and a beamforming feedback frame (e.g., 1014, 1034). In an aspect, a frame sequence may include, in order, an NDPA frame, an NDP frame, and a beamforming feedback frame, and the frame sequence may be referred to as a UL sounding frame sequence. Between the two UL sounding frame sequences, there may be contention periods. Furthermore, the UL sounding protocol of FIG. 10 may be associated with more total air-time (e.g., compared to a DL sounding protocol) since there are multiple beamformers and each beamformer is associated with its own separate sounding frame sequence. In this regard, the NDPA frames 1010 and 1030 may be redundant and increase overhead of the UL sounding protocol. In some cases, due to a clear channel assessment (CCA) time between the sounding frame sequences, the beamforming feedback information may be less coherent regarding an actual channel status relative to a case in which the UL sounding protocol is more temporally compact (e.g., associated with reduced air-time and/or reduced contention periods).

Figure 11:
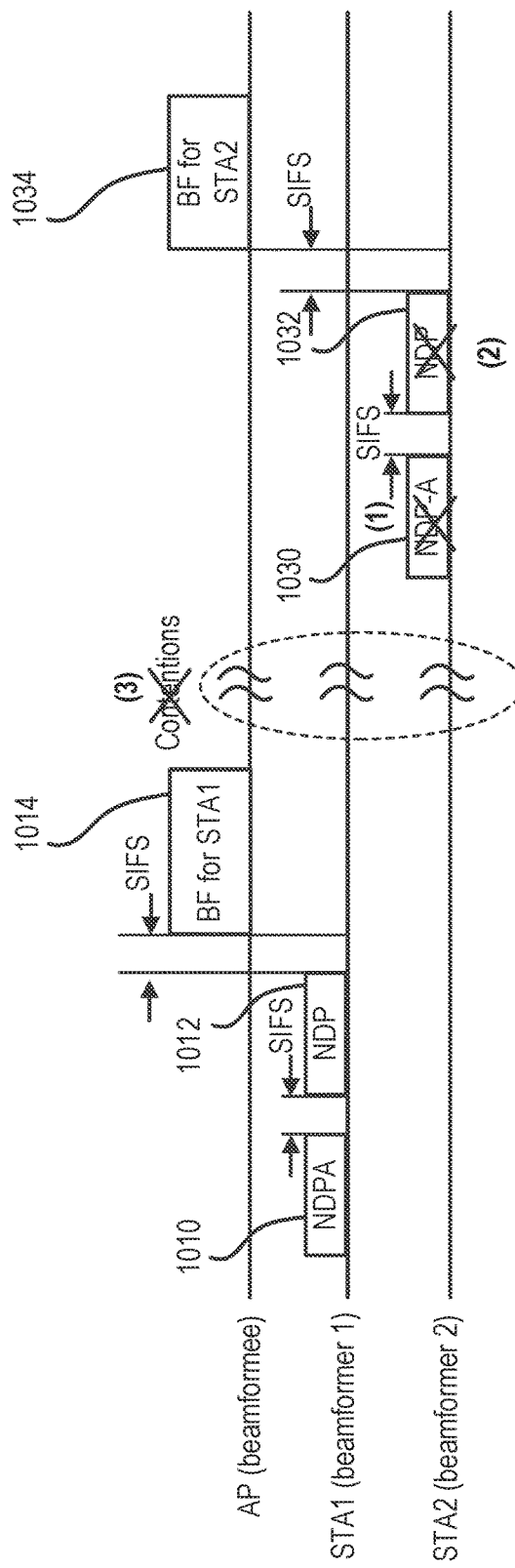
FIG. 11 illustrates examples of approaches by which to facilitate UL sounding.

FIG. 11 illustrates examples of approaches by which to facilitate UL sounding. The description from FIG. 10 generally applies to FIG. 11, with examples of differences between FIG. 10 and FIG. 11 and other description provided herein for purposes of clarity and simplicity. As shown in FIG. 11, in one or more implementations, the subject technology may support efficient sounding protocols for uplink channel sounding. One or more implementations of the subject technology may facilitate (1) a reduction in the number of NDPA frames; (2) a reduction in the number of NDP frames, and/or (3) a reduction (e.g., minimization) of contention periods between UL sounding frame sequences.

In one or more implementations, an NDPA frame format associated with a DL sounding protocol may be modified to facilitate a UL sounding protocol. For instance, with reference back to FIG. 7, the NDPA frame utilized in a DL sounding protocol may be an announcement from a beamformer to multiple beamformees, and, upon receipt of the NDPA frame by a beamformee, may cause the beamformee to expect to receive an NDP frame from the beamformer. The beamformee may generate beamforming information (e.g., channel information) and feed the beamforming information back to the beamformer.

To facilitate a UL sounding protocol, in one or more implementations, an NDPA frame may be utilized as an announcement that a beamformee is ready (e.g., expects) to receive NDP frames from one or more beamformers. In an aspect, such an NDPA frame may be referred to as an NDP-Receiving-Announcement frame. In contrast, the NDPA frame utilized for a DL sounding protocol may be referred to as an NDP-Transmitting-Announcement frame. In other words, the AP may transmit an NDP-Receiving-Announcement frame (e.g., in UL sounding) or an NDP-Transmitting-Announcement frame (e.g., in DL sounding) to provide an indication/announcement of an expectation to receive or transmit, respectively, an NDP frame. For simplicity, the term NDPA frame may refer to an NDP-Receiving-Announcement frame or an NDP-Transmitting-Announcement frame. In an aspect, with reference to FIG. 8, one or more bits of the reserved bits in the Sounding Dialog Token field of the NDPA frame 800 can be used as an indication of whether an NDPA frame is an NDP-Receiving-Announcement frame or an NDP-Transmitting-Announcement frame. In another aspect, one or more bits of the reserved bits in the Sounding Dialog Token field of the NDPA frame 800 can be used as an indication of whether an NDPA frame is for UL sounding or for DL sounding. In an aspect, other fields of the NDPA frame 800 may be utilized and/or repurposed to include the indication.

Figure 12:
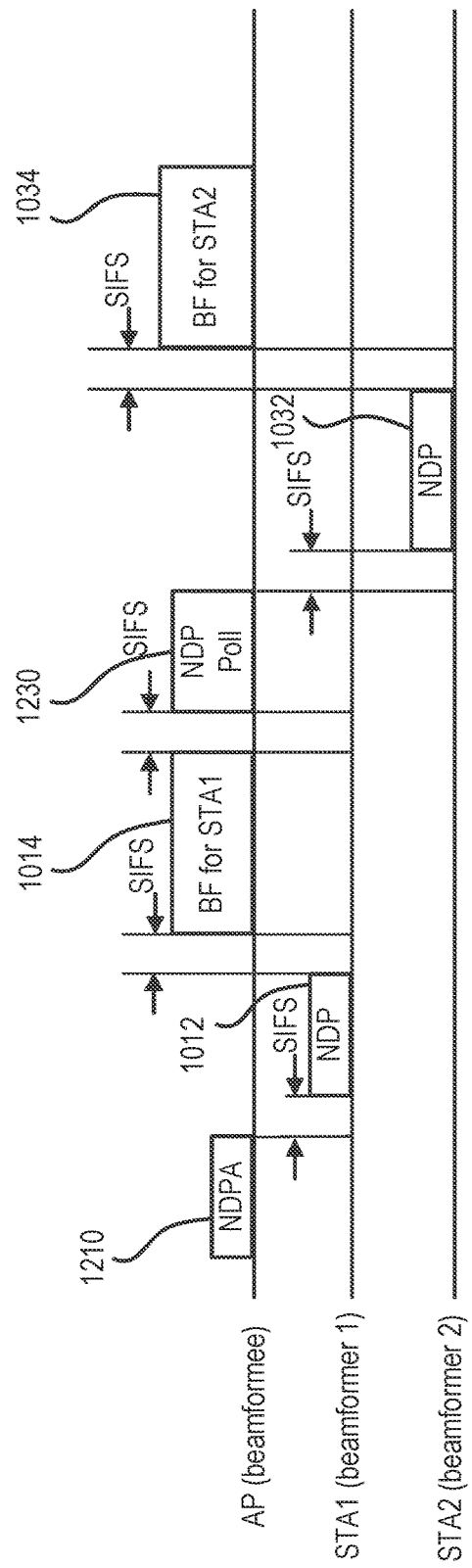
FIGS. 12 and 13 illustrate examples of UL sounding protocols.

FIG. 12 illustrates an example of a UL sounding protocol. The description from FIG. 10 generally applies to FIG. 12, with examples of differences between FIG. 10 and FIG. 12 and other description provided herein for purposes of clarity and simplicity.

The AP may transmit an NDPA frame 1210 to STA1 and STA2. The NDPA frame 1210 may be utilized to identify the beamformers (e.g., STA1, STA2) associated with the UL sounding protocol and may be considered an indication/announcement of the AP being ready to receive NDP frames from the stations. In an aspect, since the beamformee transmits the NDPA frame 1210, the beamformee may be considered an initiator of the UL sounding protocol and the beamformers may be considered responders of the UL sounding protocol.

In response to the NDPA frame 1210, STA1 may transmit the NDP frame 1012 to the AP. The AP may generate beamforming information (e.g., measured channel information) based on the NDP frame 1012 and transmit the beamforming feedback frame 1014 that contains the beamforming information (e.g., compressed beamforming information) to STA1.

The AP may transmit an NDP poll frame 1230 to STA2 for requesting that STA2 transmit an NDP frame to the AP. In an aspect, the AP may transmit the NDP poll frame 1230 at an xIFS (e.g., SIFS) after transmitting the beamforming feedback frame 1014 to STA1. The NDP poll frame 1230 may identify an intended recipient of the NDP poll frame 1230 in an RA field of the NDP poll frame 1230. In this regard, the NDP poll frame 1230 may target a specific beamformer and may be interpreted as an indication/announcement that the AP is ready to receive an NDP frame from the specific beamformer. The NDP poll frame 1230 may be utilized to cause the beamformer to transmit an NDP frame to the AP.

In response to the NDP poll frame 1230, STA2 may transmit the NDP frame 1032 to the AP. The AP may generate beamforming information based on the NDP frame 1032 and transmit the beamforming feedback frame 1034 that contains the beamforming information to STA2. In an aspect, another NDPA frame (e.g., NDP-Receiving-Announcement frame) may be utilized in place of the NDP poll frame 1230. In an aspect, the NDPA frame 1210 and/or the NDP poll frame 1230 may be the NDPA frame 800 or a modified version thereof.

Referring back to FIG. 8, in some aspects, to facilitate UL sounding, one or more fields of the NDPA frame 800 of FIG. 8 can be set/interpreted in a same or similar manner as one or more fields of a VHT NDPA frame whereas other field(s) of the NDPA frame 800 may be set/interpreted differently from the fields of the VHT NDPA frame. In an aspect, the Frame Control, RA, TA, and/or Sounding Dialog Token Number fields may be the same as in the VHT NDPA frame. In an aspect, the STA Info field(s) may be interpreted differently from the VHT NDPA frame. For example, for UL sounding, the AID12 field may contain the 12 least significant bits of the AID of a station (e.g., STA1 in FIG. 12) expected to send an NDP frame (e.g., 1012) that follows an NDPA frame (e.g., 1210) or an NDP poll frame (e.g., 1230). In some cases, the AID12 field may be set equal to 0 if the station is an AP, mesh station, or station that is a member of an independent basic service set (IBSS). The Feedback Type field may indicate the type of feedback to be sent (e.g., by the beamformee to the beamformer). In some cases, the Feedback Type field can be set to single user (SU). The Nc Index field may be the same as in the VHT NDPA frame. In some cases, the Nc Index field can be reserved since the feedback is SU.

In one or more implementations, a UL MU trigger frame may be utilized to reduce the number of NDP transmissions. In an aspect, the UL MU trigger frame may be utilized to trigger NDP transmission in a UL MU OFDMA and/or UL MU-MIMO manner. In such an aspect, the UL MU trigger frame may be referred to as an NDP trigger frame. The UL MU trigger frame may include station information that identifies the stations associated with the UL MU sounding protocol. In an aspect, for each station associated with the UL MU sounding protocol, the station information may indicate the station's AID or partial AID (e.g., AID12) and a number of streams for the station. The UL MU trigger frame may include resource allocation information for NDP transmission. For instance, the resource allocation information may indicate which frequency/spatial resource(s) are allocated to which stations for transmission of NDP frames by the stations (e.g., the beamformers) to the AP (e.g., the beamformee).

In some aspects, the UL MU trigger frame may include a maximum rank value among the stations. The maximum rank value may be, or may be indicative of, a highest number of spatial streams utilized by one of the stations. In an aspect, the number of HE-LTF symbols included in an NDP frame for all the stations may be based on (e.g., proportional to) the maximum rank value, as described below with respect to FIGS. 18 and 19. The maximum rank value may be utilized by all the stations to allow the stations to be aligned in terms of HE-LTF symbols (e.g., utilize the same number of HE-LTF symbols).

Figure 13:
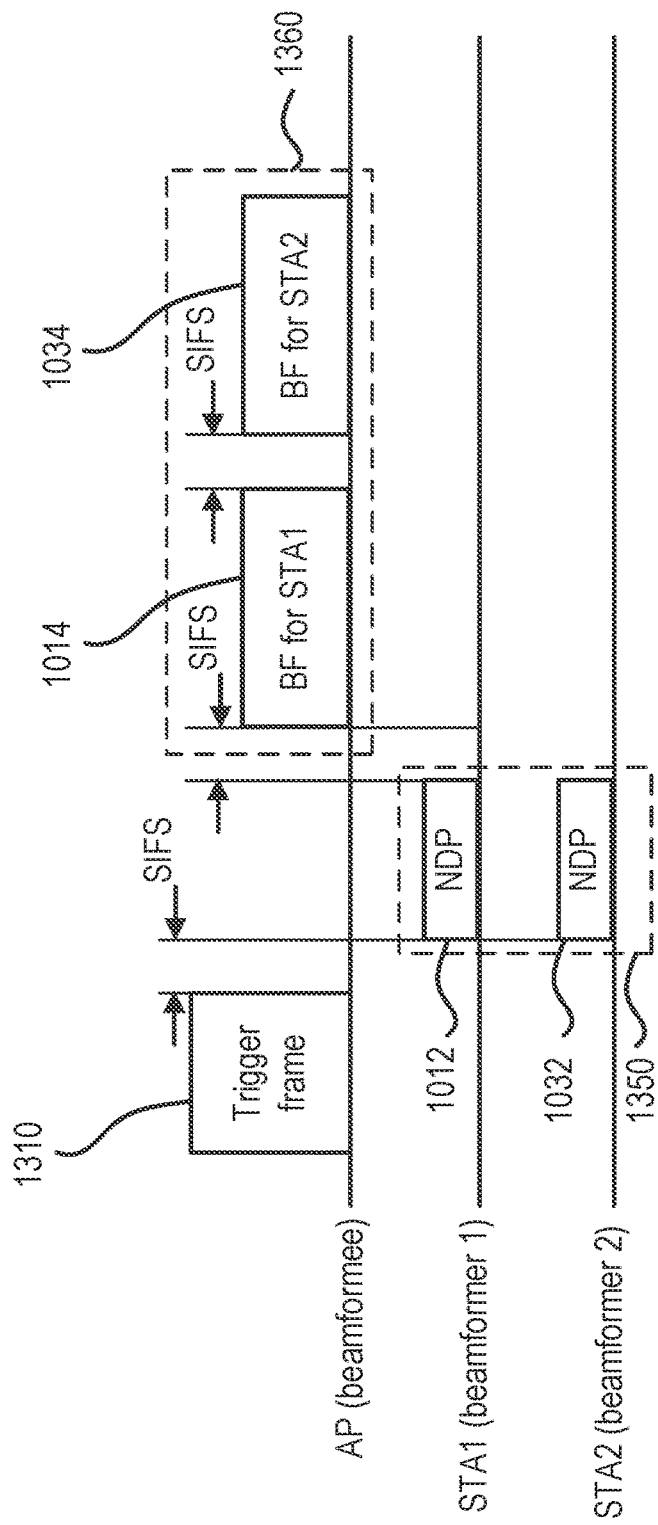

FIG. 13 illustrates an example of a UL sounding protocol. In FIG. 13, the AP (e.g., the beamformee) may transmit a trigger frame 1310 to solicit an NDP frame from the stations (e.g., STA1, STA2) associated with the sounding protocol. In an aspect, the trigger frame 1310 may be referred to as a UL MU trigger frame, an NDP trigger frame, an NDP triggering frame, or a variant thereof (e.g., a UL NDP trigger frame). In an aspect, the trigger frame 1310 may be utilized by the AP to solicit an NDP frame simultaneously from the beamformers. For instance, the NDP frames 1012 and 1032 of the beamformers may be multiplexed by UL MU OFDMA and/or UL MU-MIMO.

In some aspects, the trigger frame 1310 may indicate resource allocation information for the beamformers, including but not limited to a frequency subband (or a frequency subchannel) assigned to each respective one of the beamformers. In some aspects, the resource allocation information may also include scheduling information regarding when a respective one of the beamformers may transmit using its assigned frequency subband, and/or may include the number of spatial streams that the beamformers may use.

In response to the trigger frame 1310, STA1 and STA2 may transmit (e.g., simultaneously transmit) the NDP frame 1012 and 1032, respectively. In an aspect, the NDP frames 1012 and 1032 may be transmitted in a UL MU OFDMA and/or UL MU-MIMO manner in accordance with the resource allocation information of the trigger frame 1310. For instance. STA1 and STA2 may transmit the NDP frame 1012 and 1032, respectively, in a respective frequency subband assigned to STA1 and STA2.

Upon receipt of the NDP frames 1012 and 1032, the AP may generate respective beamforming information based on each of the NDP frames 1012 and 1032. The AP may transmit to STA 1 the beamforming feedback frame 1014 that contains the beamforming information generated based on the NDP frame 1012 and transmit to STA2 the beamforming feedback frame 1034 that contains the beamforming information generated based on the NDP frame 1032. In an aspect, the beamforming information generated based on the NDP frames 1012 and 1032 may be associated with the respective frequency subband(s) in which the NDP frames 1012 and 1032 were transmitted. For instance, if the NDP frame 1012 is transmitted in a frequency subband, the beamforming information generated based on the NDP frame 1012 may be applicable to beamforming for the frequency subband.

In an aspect, the beamforming feedback frames 1014 and 1034 may be transmitted sequentially in time. For instance, the AP may transmit the beamforming feedback frame 1014 to STA1 followed by the beamforming feedback frame 1034 to STA2. In another aspect, the AP may transmit the beamforming feedback frames 1014 and 1034 simultaneously in time, with each beamforming feedback frame being multiplexed in DL MU (e.g., MU OFDMA, MU-MIMO). In an aspect, the resources utilized for DL MU may be the same as the resources utilized for UL MU. For instance, the AP may transmit the beamforming feedback frames 1014 and 1034 to STA1 and STA2, respectively, in the same frequency subbands as those allocated to STA1 and STA2 for the NDP frame transmission.

In some aspects, the frames 1014, 1034, and 1310 are Media Access Control (MAC) Protocol Data Units (MPDUs) (e.g., MAC frames). The MPDUs may be a payload(s) of a PPDU multiplexed by UL OFDMA and/or UL MU-MIMO. For instance, the frames 1014 and 1034 may be payloads of a PPDU 1360. The frames 1012 and 1032 may be a part of a PPDU 1350. For instance, an HE-LTF field(s) of the NDP frames 1012 and 1032 may be multiplexed by UL OFDMA. The PPDUs 1350 and 1360 may have the format of the HE frame 600 shown in FIG. 6.

In one or more aspects, the trigger frame 1310 can have an indication of whether or not the trigger frame 1310 is for soliciting NDP frames from the beamformers. The indication (e.g., indication bit or bits) may be referred to as an explicit indication. In some aspects, the trigger frame 1310 does not include an explicit indication. In such aspects, the beamformers may implicitly determine whether or not the trigger frame 1310 is for soliciting NDP frames based on a length contained in the trigger frame 1310. The length contained in the trigger frame 1310 may be indicative of a length of a UL MU PPDU to be transmitted by the beamformers in response to the trigger frame 1310 and may be referred to as a PPDU length, a UL PPDU length, a following UL PPDU length, a UL MU PPDU length, or a variant thereof.

Since NDP frames (which contain no HE-DATA field) generally have a short PPDU length, a beamformer that receives the trigger frame 1310 may parse/decode the payload of the trigger frame 1310 to obtain the PPDU length and determine whether or not the trigger frame 1310 is for soliciting NDP frames. For instance, the beamformer may determine that the trigger frame 1310 is for soliciting NDP frames when the length indicated by trigger frame 1310 is a shortest possible PPDU length or a length less than a predetermined threshold length. With reference to FIG. 13, the UL MU PPDU solicited by the trigger frame 1310 may include the NDP frames 1012 and 1032 from STA1 and STA2, respectively.

In an aspect, the location of information bit(s) in the trigger frame 1310 that contain the UL MU PPDU length may be such that the UL MU PPDU length may be decodable first. In an aspect, within a specific frequency band allocation for MU NDP frame transmission, MU-MIMO can also be applied. For example, the trigger frame 1310 may allocate a resource unit (e.g., RU#4) to multiple stations and these stations allocated to the resource unit may be multiplexed in the spatial domain. In this example, the trigger frame 1310 may also include spatial configuration information, such as a start and end index among total spatial streams for each station.

Figure 14:
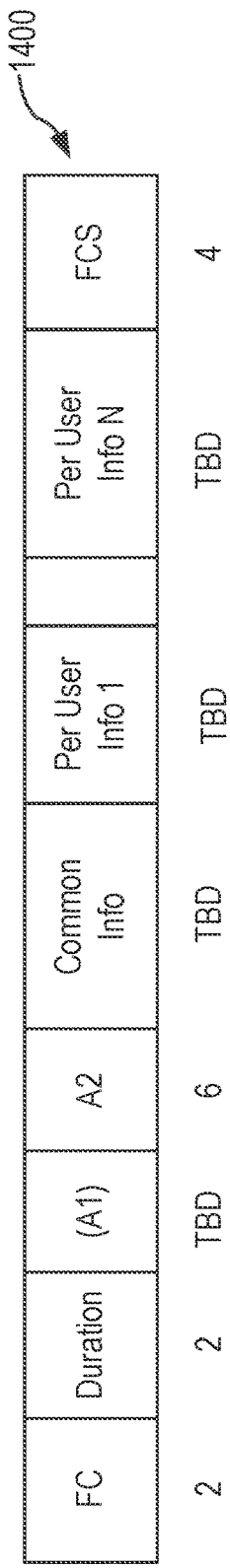
FIG. 14 illustrates an example of a trigger frame.

FIG. 14 illustrates an example of a trigger frame 1400. In some aspects, the trigger frame 1310 of FIG. 13 may be, may include, or may be a part of, the trigger frame 1400. The trigger frame 1400 includes a Frame Control (FC), a Duration, a Common Information (Common Info). Per User Information (Per User Info), and a Frame Check Sequence (FCS) field, among other fields. In an aspect, the station information (e.g., AID, number of spatial streams) and resource allocation information (e.g., frequency resource allocation information) can be included in the Common Info field and/or the Per User Info field(s). In an aspect, the maximum rank value among stations may be included in the Common Info field, since the maximum rank value may affect a number of HE-LTF symbols to be included in an NDP frame for all stations. In another aspect, the maximum rank value may be included in a TBD field such as an A1 field. The A1 field may be an RA field that may be repurposed to contain other information, such as to contain the maximum rank value.

In one or more aspects, the trigger frame 1400 may be an NDPA frame (e.g., 800) or a modified version thereof, such as an NDP-Receiving-Announcement frame. In such aspects, the NDPA frame (e.g., in the STA Info field) may include resource allocation information for each station.

Figure 15:
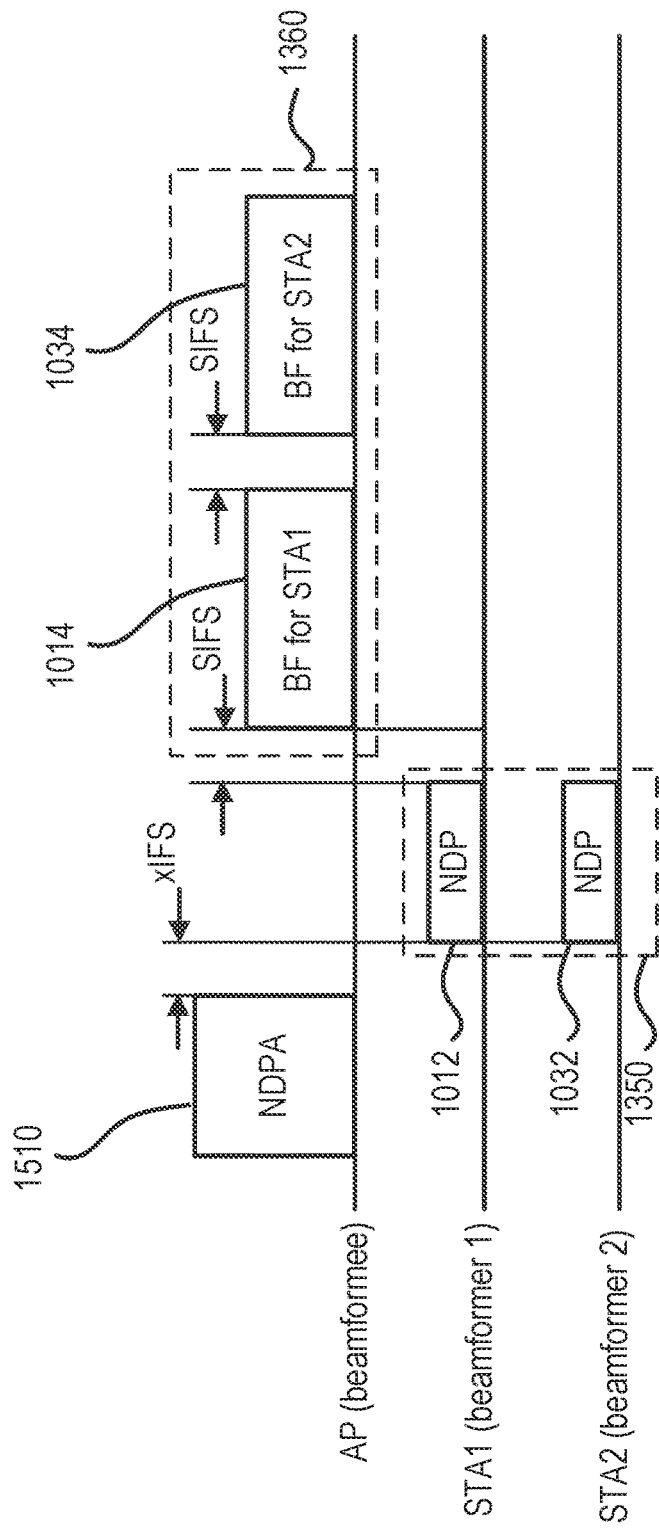
FIGS. 15-17 illustrate examples of UL sounding protocols.

FIG. 15 illustrates an example of a UL sounding protocol. The description from FIG. 13 generally applies to FIG. 15, with examples of differences between FIG. 13 and FIG. 15 and other description provided herein for purposes of clarity and simplicity. In FIG. 15, the AP may transmit an NDPA frame 1510 to solicit an NDP frame from the stations (e.g., STA1, STA2) associated with the UL sounding protocol. The NDPA frame 1510 may indicate resource allocation information for the stations and, when received by the stations, may cause each station to transmit (e.g., simultaneously transmit) an NDP frame using resources indicated to the station in the NDPA frame 1510. The stations may transmit the NDP frames 1012 and 1032 in an UL MU OFDMA and/or UL MU-MIMO manner. Upon receipt of the NDP frames 1012 and 1032, the AP may generate respective beamforming information based on each of the NDP frames 1012 and 1032 and transmit (e.g., simultaneously transmit or sequentially transmit) the beamforming feedback frames 1014 and 1034 that contain the respective beamforming information.

In one or more implementations, a station can request an AP to initiate a UL sounding protocol that includes the requesting station. In an aspect, the request may be a request bit included in an HE control field, a quality of service (QoS) control field, or any reserved field in a MAC header of a UL frame transmitted to the AP prior to the AP initiating UL sounding. In some cases, even without this request/indication from the station, the AP can determine whether a sounding protocol should be initiated for updating UL channel state information (CSI) since triggering for UL MU transmission from stations and scheduling of the UL MU transmission may be performed/determined by the AP. However, in some cases, a station may be more aware than the AP of when some updates to the station's UL CSI is desirable, and thus the AP may trigger and/or schedule the sounding protocol based at least in part on the station's request.

In some aspects, when a station requests that the AP initiate UL sounding, the station may provide the AP with additional information such as, for instance, a buffer status report of the station and a preferred bandwidth information (e.g., a preferred subband or a set of preferred subbands) for which the station requests to receive beamforming feedback information. Based on the request and additional information, the AP can initiate a UL sounding protocol. In an aspect, more than one station may request the AP to initiate the UL sounding protocol.

The AP may determine whether to trigger and schedule a UL sounding protocol based on information (if any) provided by the station(s) (e.g., the preferred subband(s) included with a request), although, in some aspects, the AP can determine whether to trigger and schedule the UL sounding protocol at its sole discretion and does not need to take into consideration information from the station(s). Similarly, the AP may allocate resources (e.g., frequency subbands) to the stations based on information (if any) provided by the station(s), although, in some aspects, the AP can allocate the resources at its sole discretion and does not need to take into consideration information from the station(s).

Figure 16:
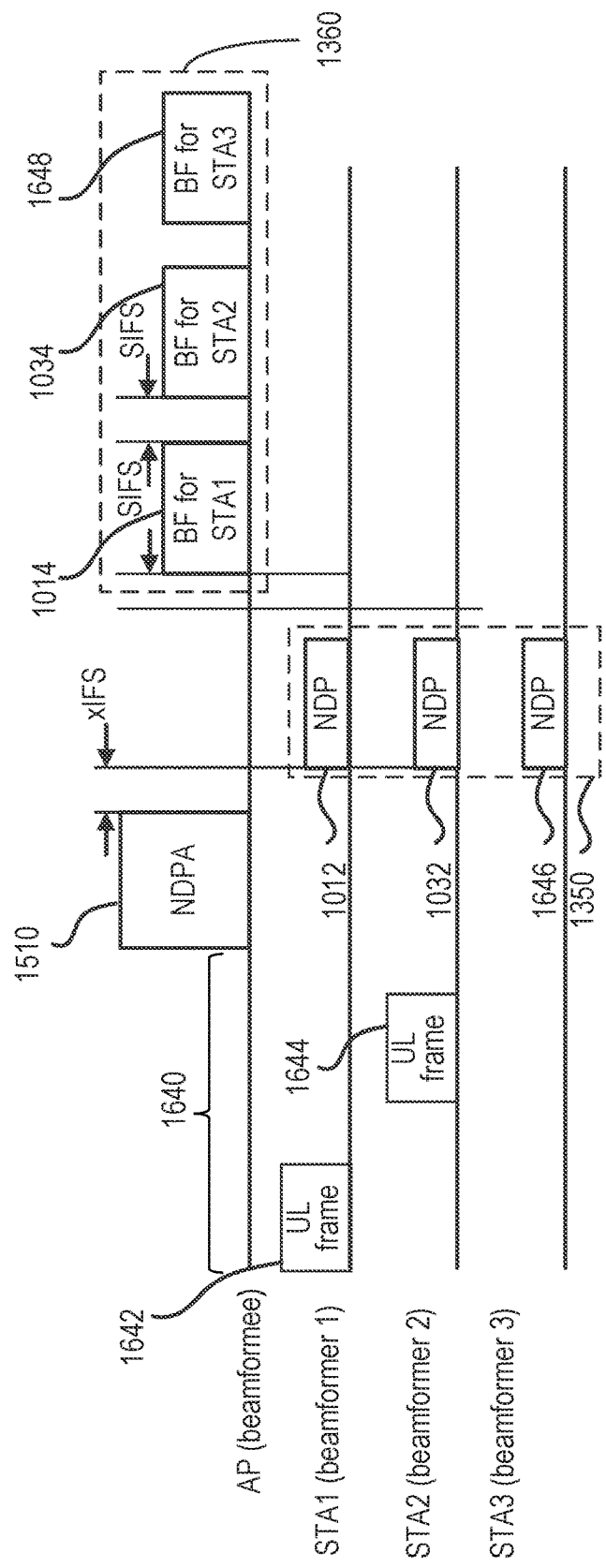

FIG. 16 illustrates an example of a UL sounding protocol. The description from FIG. 13 generally applies to FIG. 16, with examples of differences between FIG. 13 and FIG. 16 and other description provided herein for purposes of clarity and simplicity.

STA1 and STA2 may transmit an uplink frame 1642 and 1644, respectively, that each contains a UL sounding request. In an aspect, the uplink frames 1642 and 1644 may include preferred bandwidth information and/or a buffer status report associated with STA1 and STA2, respectively. The AP may transmit the NDPA frame 1510 to solicit NDP frames. In an aspect, the AP may, but need not, transmit the NDPA frame 1510 in response to the uplink frames 1642 and 1644. The AP may transmit the NDPA frame 1510 to solicit NDP frames from stations from which the AP has received a UL sounding request and/or from a station(s) from which the AP has not received a UL sounding request. In FIG. 16, for instance, the AP may transmit the NDPA frame 1510 to solicit NDP frames from STA3 in addition to STA1 and STA2. In an aspect, NDPA frame 1510 may be a trigger frame (e.g., 1310). It is noted that contentions may occur during a time duration 1640 prior to transmission of the NDPA frame 1510.

In response to the NDPA frame 1510, STA1 may transmit the NDP frame 1012, STA2 may transmit the NDP frame 1032, and STA3 may transmit an NDP frame 1646. The NDP frames 1012, 1032, and 1646 may be transmitted in UL OFDMA and/or UL MU-MIMO manner as part of the PPDU 1350. Upon receipt of the NDP frames 1012, 1032, and 1646, the AP may generate respective beamforming information based on each of the NDP frames 1012, 1032, and 1646. In this regard, the AP may transmit the beamforming feedback frames 1014, 1034, and 1648 that contain the beamforming information generated based on the NDP frames 1012, 1032, and 1646, respectively.

In one or more implementations, upon receipt of a trigger frame by a station, the station may determine whether or not the trigger frame is soliciting an NDP frame from the station. The station may make the determination based on explicit and/or implicit information associated with the trigger frame. For instance, the station may determine whether or not the trigger frame is for soliciting an NDP frame based at least in part on a UL MU PPDU length contained in the trigger frame. In an aspect, when the station determines that the trigger frame is for soliciting an NDP frame, the station shall transmit an NDP frame to the AP regardless of any other conditions (e.g., regardless of CCA check results and existence of any other frame to be sent by the station or another station), as shown FIG. 17.

Figure 17:
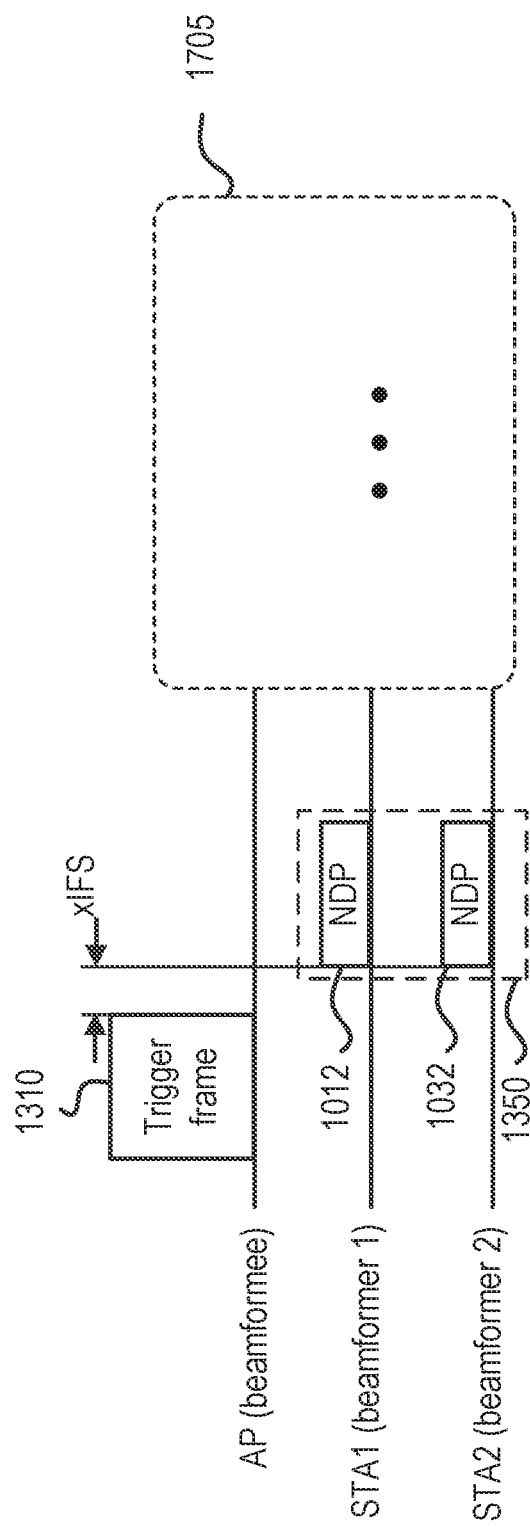

FIG. 17 illustrates an example of a UL sounding protocol. In some aspects, the trigger frame 1310 may include a shortest possible UL PPDU length or a length less than a predetermined threshold length (e.g., to allow STA1 and STA2 to determine that the trigger frame 1310 is for soliciting NDP frames). STA1 and STA2 may transmit the NDP frames 1012 and 1032 in the resource(s) specified in the trigger frame 1310. In some aspects, the AP may provide STA1 and/or STA2 with an indication of whether or not to perform CCA.

In some aspects, upon receiving the trigger frame 1310 from the AP, STA1 and STA2 may transmit the NDP frames 1012 and 1032 after the trigger frame 1310 regardless of CCA check results and existence of any other frame to be sent after the trigger frame 1310, such as a frame previously scheduled to be sent between the end of the trigger frame 1310 and the end of the time block 1705. In these aspects, a station's behavior may be different from the station behavior associated with a non-HE trigger frame (e.g., IEEE 802.11ac-based trigger frame). In an aspect, in the non-HE case, a triggered station may determine (e.g., based on criteria associated with CCA check results and/or existence of any other frame to be sent after the trigger frame) not to send a frame in response to a trigger frame.

In other aspects, transmission of the NDP frames 1012 and 1032 may be set to be dependent (e.g., optionally dependent) on CCA check results. In these aspects, STA1 and STA2 may take CCA check results into consideration when determining whether or not to transmit the NDP frames 1012 and 1032, respectively. In an aspect, the CCA check may be performed during an interframe spacing interval before transmission of the NDP frames 1012 and 1032.

In one or more implementations, after receiving an NDP trigger frame, each station may transmit an NDP frame in an allocated frequency band. In an aspect, the NDP frame from each station may be transmitted in accordance with one or more of the following:

HE-LTF sequence for each subband allocated to a station is sent by the station to the AP;

The number of HE-LTF symbols corresponds to the maximum rank value among STAs and is set to be the same for all stations;

None of the stations send an NDP frame (e.g., HE-LTF symbols of the NDP frame) in non-allocated subbands.

Figure 18:
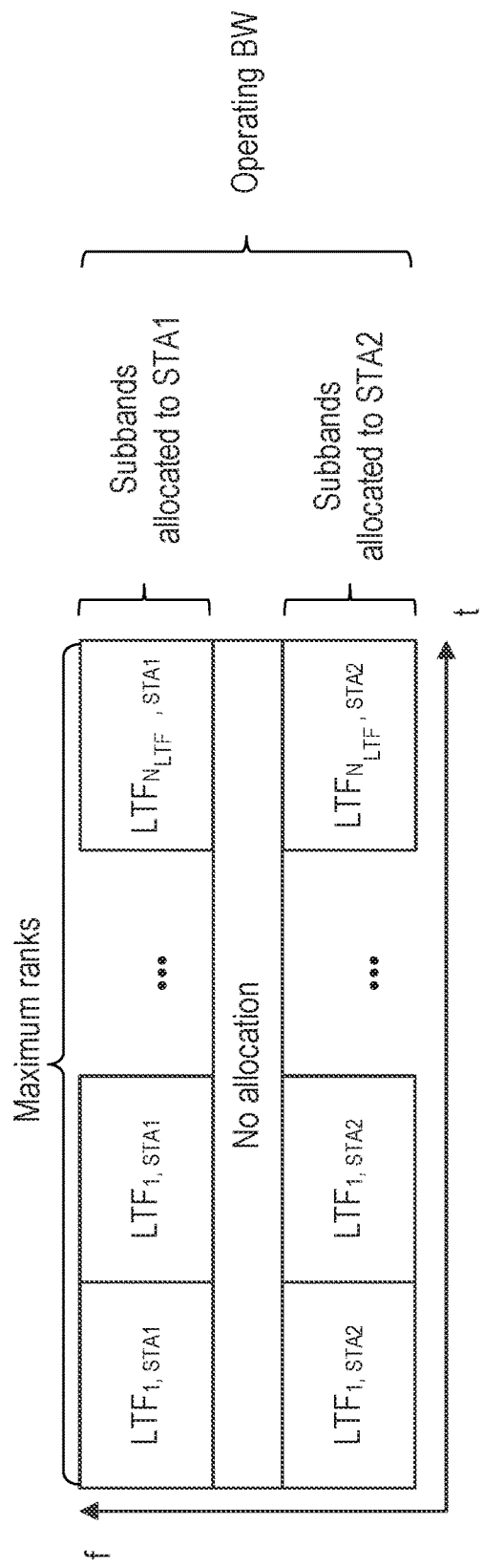
FIGS. 18 and 19 illustrate examples of high efficiency long training field (HE-LTF) symbols of a non-data packet frame.

FIG. 18 illustrates an example of HE-LTF symbols of an NDP frame. In FIG. 18, STA1 and STA2 transmit the HE-LTF symbols of the NDP frame in a respective subband allocated to STA1 and STA2. In an aspect, the number of HE-LTF symbols transmitted by STA1 and STA2 are the same. In some aspects, the AP may determine the number of HE-LTF symbols to be transmitted by both STA1 and STA2 based on a higher number of spatial streams between STA1 and STA2 and may indicate this number to STA1 and STA2 (e.g., in a trigger frame). For instance, at the time of association, the AP may obtain the maximum number of antennas/spatial streams that each station may support. The obtained information may then be utilized by the AP when determining the number of HE-LTF symbols to be transmitted by STA1 and STA2.

The subbands allocated to STA1 and STA2 are within an operating bandwidth associated with UL transmission. In an aspect, the operating bandwidth may be 20 MHz, 40 MHz, 80 MHz, or 160 MHz, and the subbands allocated to each station may be a portion of the operating bandwidth. In an aspect, the NDP frame may be the HE frame 600 without the HE-DATA field. The legacy header and the non-legacy header (e.g., HE header) excluding the HE-LTF symbols may be transmitted over the entire operating bandwidth, whereas the HE-LTF symbols may be transmitted in the subbands allocated to the stations. Examples of the NDP frame are described below with respect to FIGS. 27 and 28. In an aspect, no HE-LTF transmission occurs within a subband of the operating bandwidth to which no station is allocated.

Figure 19:
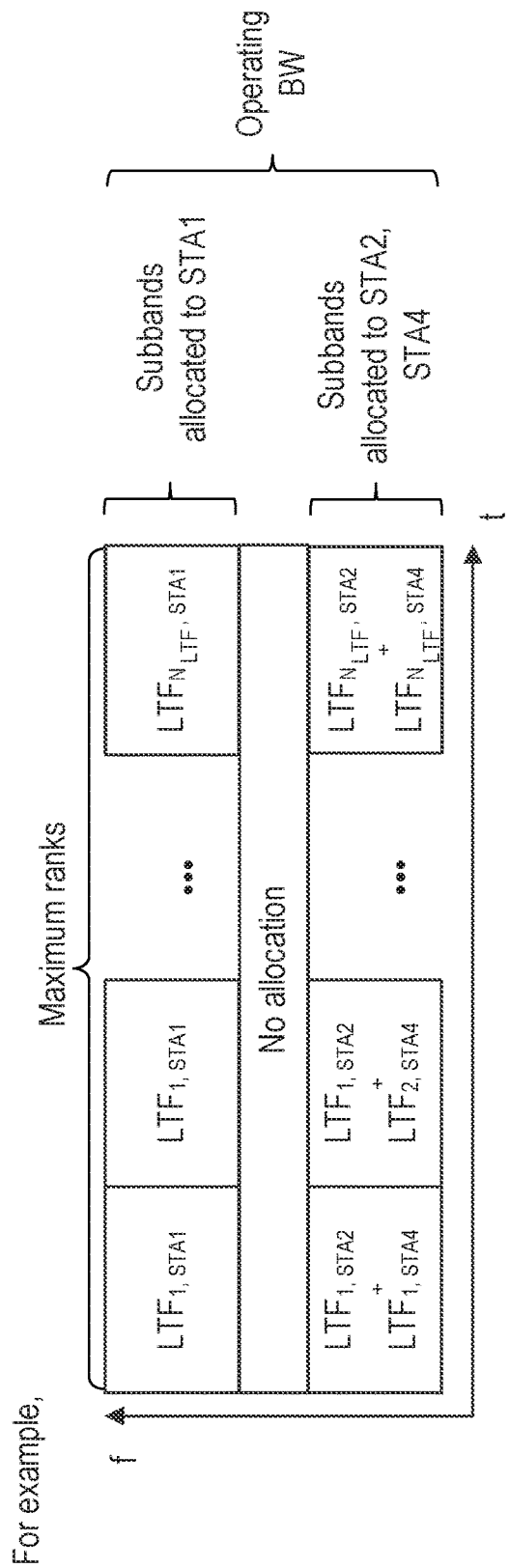

FIG. 19 illustrates an example of HE-LTF symbols of an NDP frame. The description from FIG. 18 generally applies to FIG. 19, with examples of differences between FIG. 18 and FIG. 19 and other description provided herein for purposes of clarity and simplicity. In FIG. 19, the subbands allocated to STA2 and STA4 overlap. The HE-LTF symbols of STA2 and STA4 may be multiplexed in the spatial domain (e.g., in UL MU-MIMO manner).

In one or more implementations, the NDP trigger frame (e.g., 1310) may be used for downlink beamforming with implicit sounding mechanism. In the implicit sounding mechanism, the beamformer can utilize CSI for received signals to facilitate its transmit signal beamforming.

Figure 20:
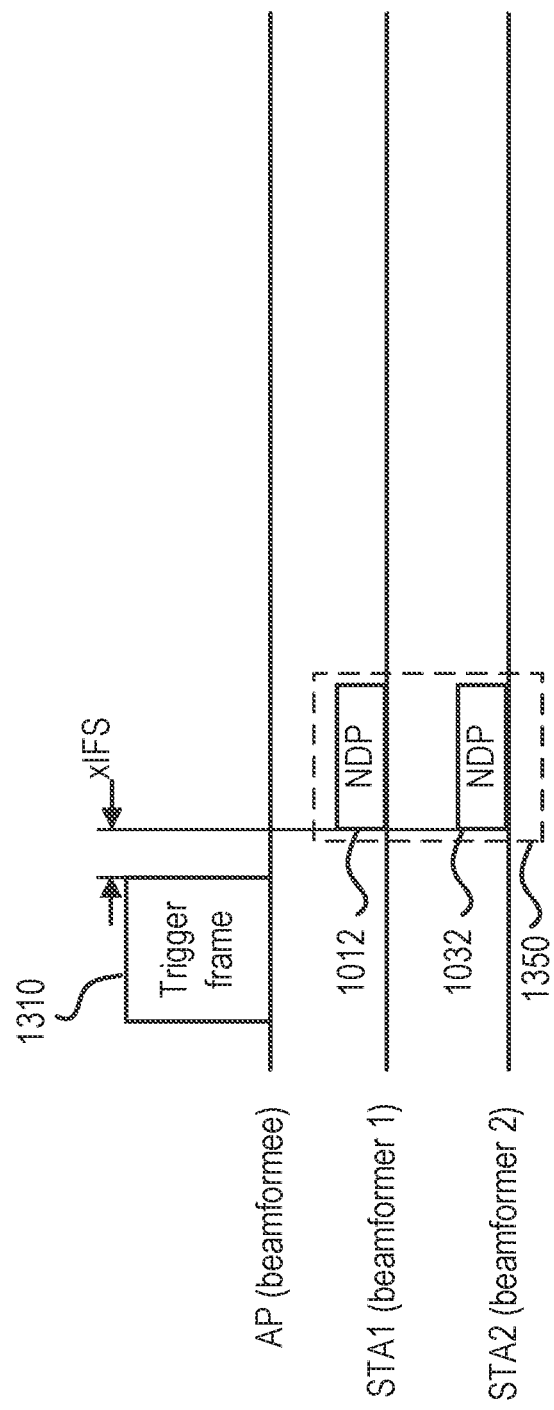
FIGS. 20-26 illustrate examples of UL sounding protocols.

FIG. 20 illustrates an example of a UL sounding protocol. The description from FIG. 13 generally applies to FIG. 20, with examples of differences between FIG. 13 and FIG. 20 and other description provided herein for purposes of clarity and simplicity. After the AP transmits the trigger frame 1310 and receives the NDP frames 1012 and 1032 (e.g., as a part of the UL MU PPDU 1350) from corresponding stations, the AP does not send a beamforming feedback frame to the stations. The AP may utilize uplink channel information collected or determined based on the NDP frames 1012 and 1032 for applying a subsequent downlink sounding (not shown). Such a UL sounding protocol may be referred to as an NDP trigger with no compressed beamforming (CB). In an aspect, the trigger frame 1310 may include an indication that no beamforming feedback frame to the stations (e.g., STA1 and STA2) follows in response to the NDP frames (e.g., 1012 and 1032) transmitted by the stations (e.g., STA1 and STA2) to the AP. In an aspect, the NDP frames 1012 and 1032 can be multiplexed in spatial domain, along with OFDMA multiplexing.

In one or more implementations, the subject technology facilitates a reduction in contention periods in the UL sounding protocol. For instance, the subject technology may provide a reduction in contention periods between sounding frame sequences associated with different stations. In some aspects, the subject technology may provide a sounding protocol that combines multiple NDP sounding frame sequences by using xIFS (e.g., SIFS) and NDPA (or NDP) poll frames.

Figure 21:
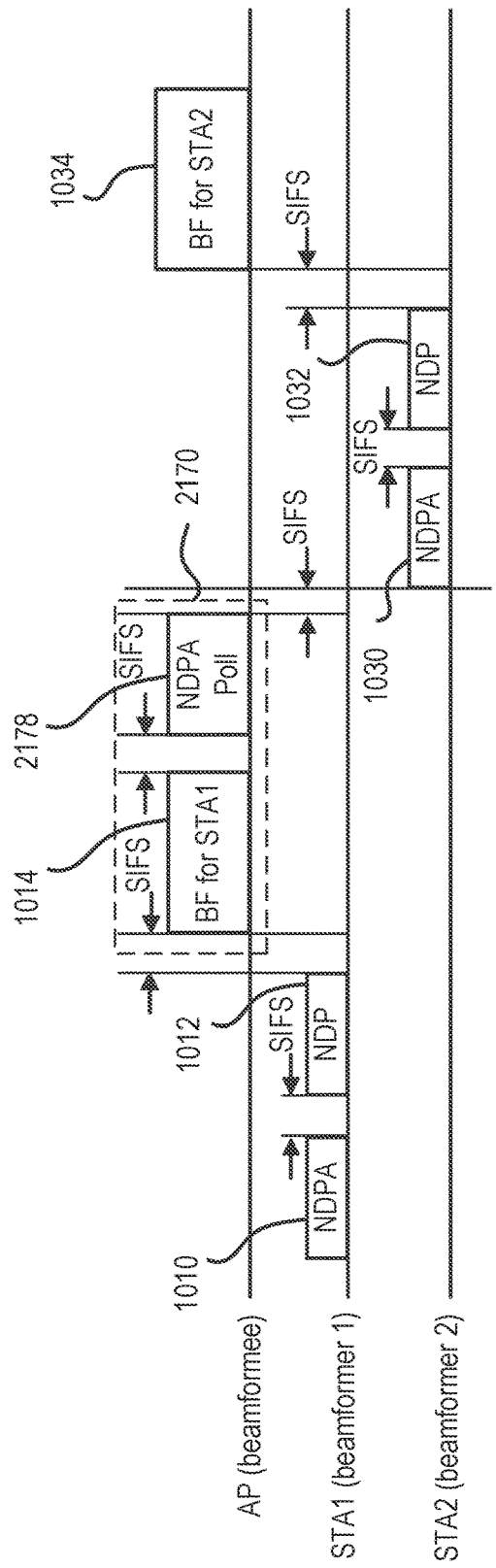

FIG. 21 illustrates an example of a UL sounding protocol. The description from FIGS. 10 and 12 generally apply to FIG. 21, with examples of differences and other description provided herein for purposes of clarity and simplicity.

STA1 may transmit the NDPA frame 1010 followed by the NDP frame 1012. The AP may generate beamforming information based on the NDP frame 1012 and transmit the beamforming feedback frame 1014. The AP may transmit an NDPA poll frame 2178 for requesting that STA2 transmit an NDPA frame to the AP. In an aspect, the AP may transmit the NDPA poll frame 2178 at an xIFS (e.g., SIFS) after transmission of the beamforming feedback frame 1014 to STA1. In another aspect, the AP may transmit (e.g., simultaneously transmit) the beamforming feedback frame 1014 and the NDPA poll frame 2178 in an MU OFDMA and/or MU-MIMO manner. In such an aspect, the beamforming feedback frame 1014 and the NDPA poll frame 2178 may be part of (e.g., payload(s) of) a PPDU 2170. In response to the NDPA poll frame 2178, STA2 may transmit the NDPA frame 1030 followed by the NDP frame 1032 to the AP. Upon receipt of the NDP frame 1032, the AP may generate beamforming information based on the NDP frame 1032 and transmit to STA2 a beamforming feedback frame 1034 that includes the beamforming information.

Figure 22:
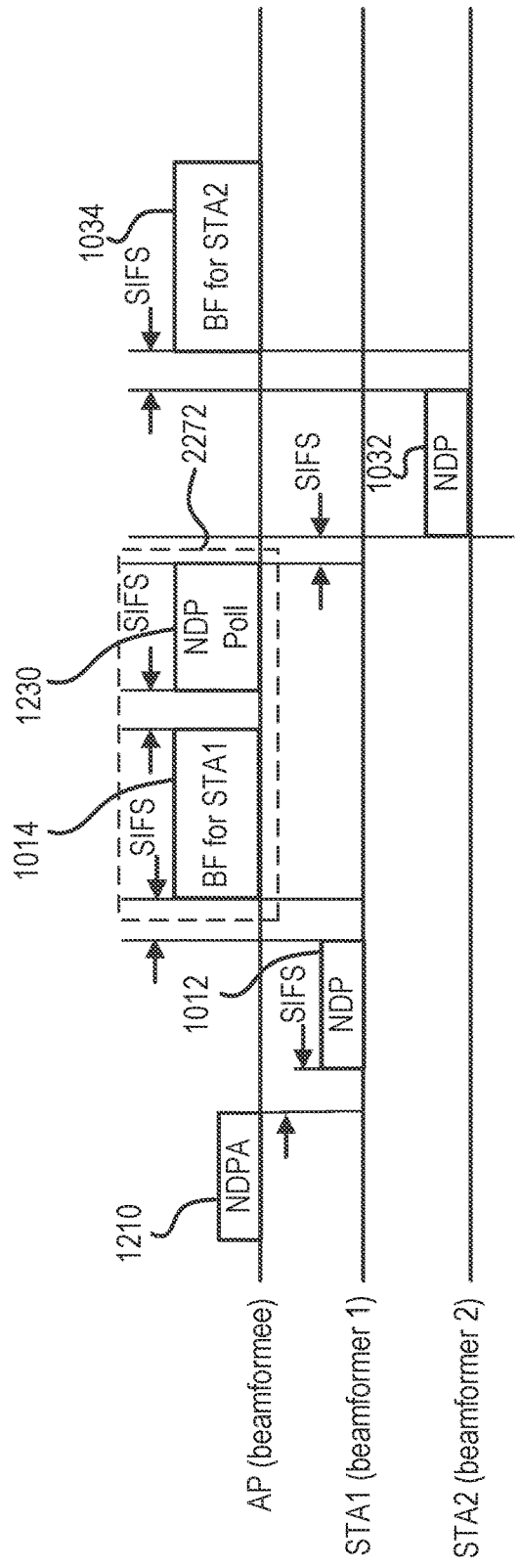

FIG. 22 illustrates an example of a UL sounding protocol. The description from FIGS. 10 and 12 generally apply to FIG. 21, with examples of differences and other description provided herein for purposes of clarity and simplicity.

The AP may transmit the NDPA frame 1210 to STA1 and STA2. In response to the NDPA frame 1210, STA1 may transmit the NDP frame 1012 to the AP. The AP may generate beamforming information based on the NDP frame 1012 and transmit the beamforming feedback frame 1014 that contains the beamforming information to STA1. The AP may transmit the NDP poll frame 1230. In an aspect, the AP may transmit the NDP poll frame 1230 after or simultaneously with (e.g., MU OFDMA and/or MU-MIMO) the beamforming feedback frame 1014. In response to the NDP poll frame 1230, STA2 may transmit the NDP frame 1032 to the AP. The AP may generate beamforming information based on the NDP frame 1032 and transmit the beamforming feedback frame 1034 that contains the beamforming information to STA2.

In FIGS. 21 and 22, in cases in which additional stations are associated with the UL sounding protocol, the AP may transmit an NDPA poll frame (in FIG. 21) or an NDP poll frame (in FIG. 22) to a next station (e.g., STA3) after or simultaneously with (e.g., MU OFDMA and/or MU-MIMO) the beamforming feedback frame 1034.

Figure 23:
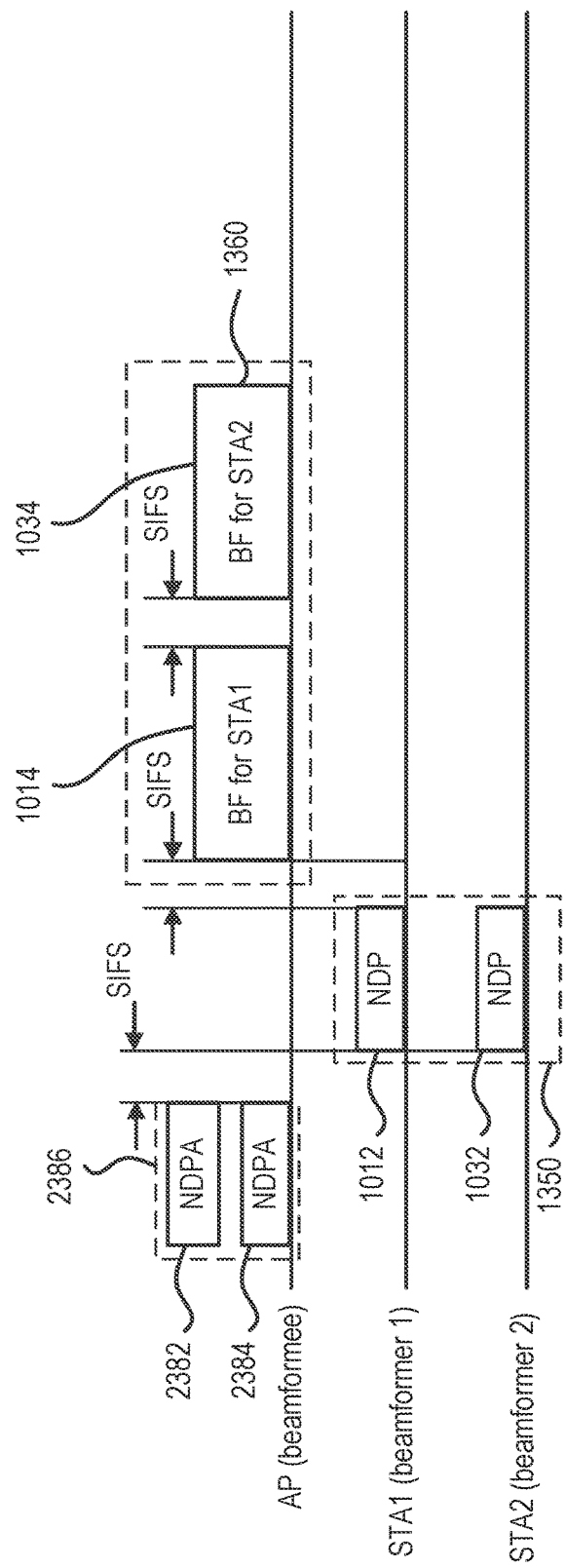

FIG. 23 illustrates an example of a UL sounding protocol. The description from FIG. 13 generally applies to FIG. 23, with examples of differences between FIG. 13 and FIG. 23 and other description provided herein for purposes of clarity and simplicity.

In FIG. 23, the AP may transmit NDPA frames 2382 and 2384. The NDPA frames 2382 and 2384 may be NDP-Receiving-Announcement frames. The NDPA frames 2382 and 2384 can be multiplexed and transmitted in DL OFDMA as a part of a PPDU 2386 to STA1 and STA2. In response to the NDPA frames 2382 and 2384. STA1 and STA2 may transmit the NDP frames 1012 and 1032, respectively, to the AP. Each of the NDPA frames 2382 and 2384 may have a single STA Info field. The respective STA Info field of the NDPA frames 2382 and 2384 may be associated with STA1 and STA2, respectively. In an aspect, each station transmits its NDP frame in the subbands in which the respective NDPA frame is received on. For instance, if the NDPA frame 2382 is associated with STA1, STA1 may transmit the NDP frame 1012 using the same subband in which STA1 received the NDPA frame 2382. The NDP frames 1012 and 1032 sent by the stations can be multiplexed in UL MU-MIMO alternative to or in addition to UL MU OFDMA. In the case of multiplexing in UL MU-MIMO, each NDPA frame or STA information for a specific station (e.g., STA Info shown in FIG. 8) may include the number of streams and stream offset to allow each of the stations to determine its absolute stream index when the stations send NDP frames using UL MU-MIMO multiplexing.

Figure 24:
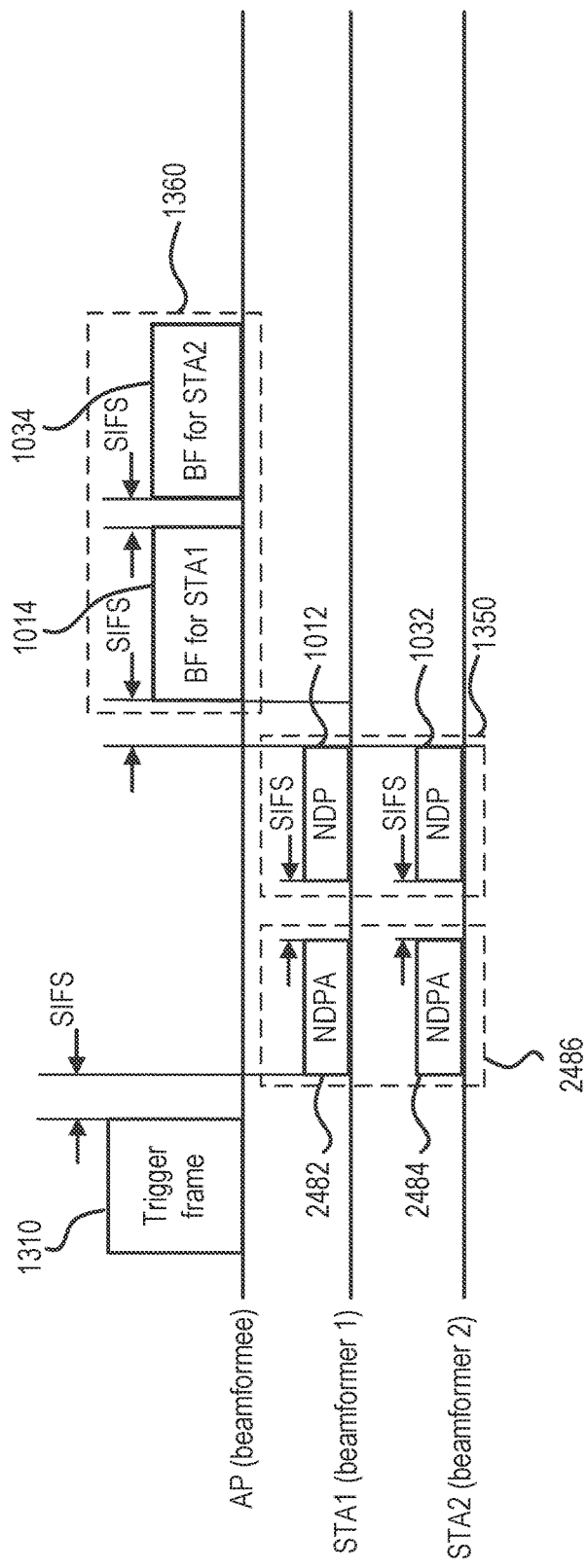

FIG. 24 illustrates an example of a UL sounding protocol. The description from FIG. 13 generally applies to FIG. 24, with examples of differences between FIG. 13 and FIG. 24 and other description provided herein for purposes of clarity and simplicity.

In FIG. 24, after the AP triggers UL MU transmission using the trigger frame 1310, each station can transmit an NDPA frame and an NDP frame. STA1 may transmit an NDPA frame 2482 followed by the NDP frame 1012 and STA2 may transmit an NDPA frame 2484 followed by the NDP frame 1032. In an aspect, each station may transmit the respective NDPA frame and NDP frame in the subbands allocated to the station by the trigger frame 1310. The NDPA frames 2482 and 2484 can be multiplexed as a UL MU OFDMA PPDU 2486. The NDP frames 1012 and 1032 can be multiplexed as the PPDU 1350 (e.g., UL MU OFDMA PPDU). An xIFS (e.g., SIFS, PIFS) may be between the PPDUs 2486 and 1350.

In one or more implementations, a UL MU trigger frame may include feedback information associated with a UL sounding protocol. In an aspect, the UL MU trigger frame may include compressed or uncompressed beamforming information (e.g., uplink measurement reports) for multiple stations.

Figure 25:
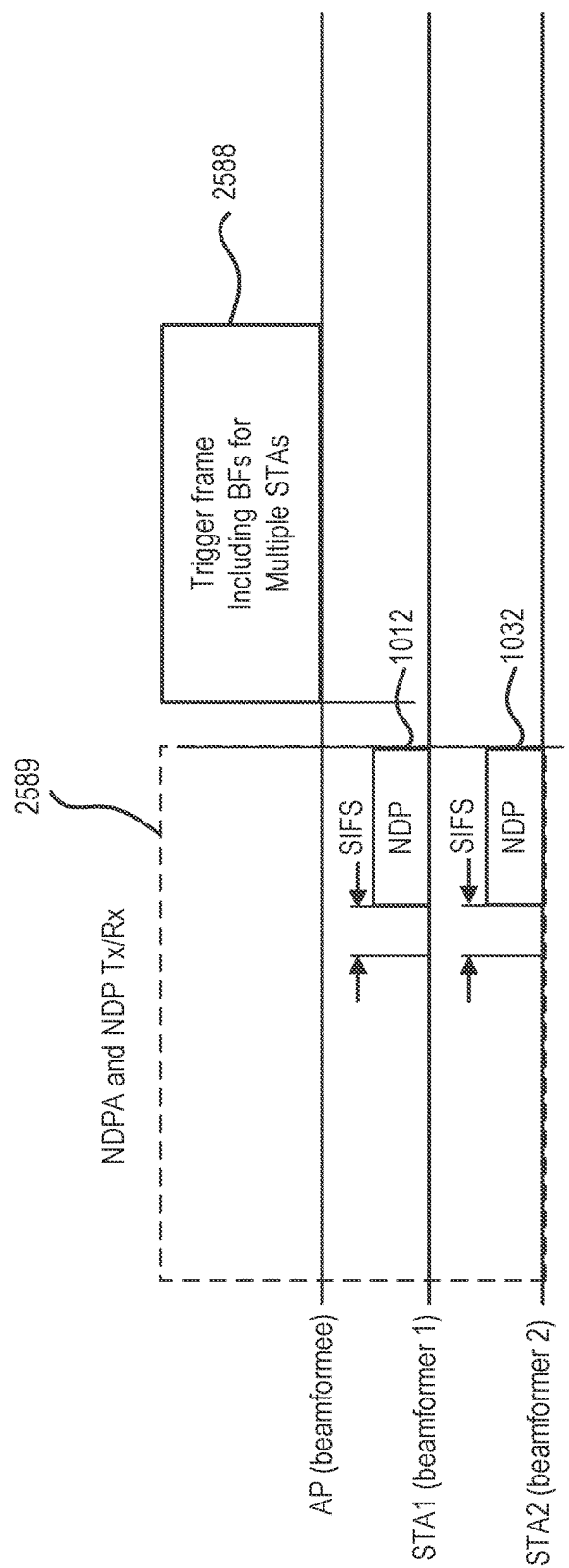

FIG. 25 illustrates an example of a UL sounding protocol. In response to receiving the NDP frames 1012 and 1032, the AP may generate beamforming information based on the NDP frames 1012 and 1032. The AP may then transmit a trigger frame 2588 to allow UL MU transmission of data. The trigger frame 2588 may contain the beamforming information generated based on the NDP frames 1012 and 1032. Although the NDP frames 1012 and 1032 are illustrated as being transmitted simultaneously, the NDP frames 1012 and 1032 may be transmitted sequentially in time. Since the UL sounding protocol is generally linked to and generally precedes a UL MU transmission, utilizing the trigger frame 2588 that triggers the UL MU transmission and contains information to facilitate UL beamforming may help reduce overhead associated with UL sounding. In an aspect, an NDPA and NDP Tx/Rx block 2589 of FIG. 25 may represent sounding frame sequences (including one or more frames) that precede transmission of beamforming feedback frames in, for example, any one of FIGS. 10-13, 15-17, and 20-24.

Figure 26:
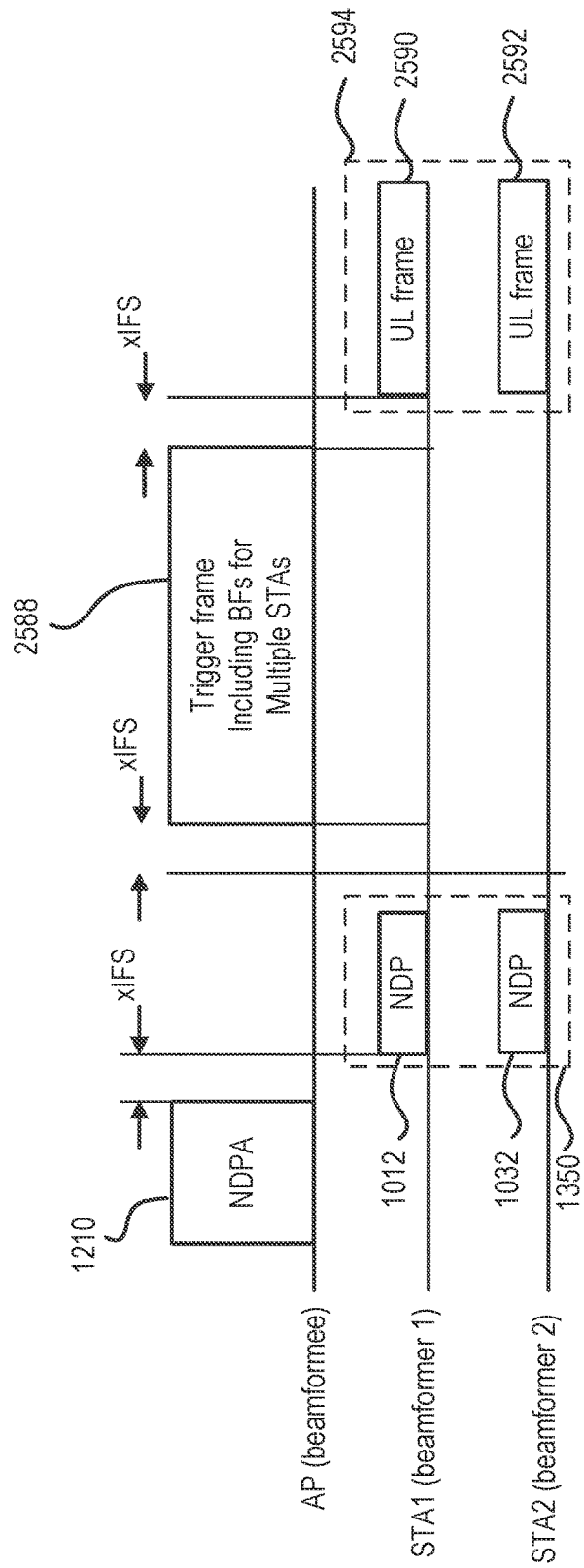

FIG. 26 illustrates an example of a UL sounding protocol. The description from FIG. 25 generally applies to FIG. 26, with examples of differences between FIG. 25 and FIG. 26 and other description provided herein for purposes of clarity and simplicity. In an aspect, the UL sounding protocol of FIG. 26 provides an example of the NDPA and NDP Tx/Rx block 2589 and an example of frame transmission subsequent to the trigger frame 2588 of FIG. 25.

The AP may transmit the NDPA frame 1210. The NDPA frame 1210 may be an NDP trigger frame. In response to the NDPA frame 1210, STA1 and STA2 may transmit the NDP frames 1012 and 1032, respectively (e.g., multiplexed in UL OFDMA and/or MU-MIMO). The AP may transmit the trigger frame 2588. In response to receiving the trigger frame 2588, STA1 and STA2 may transmit uplink frames 2590 and 2592, each of which contains data (e.g., MU data). In an aspect, the uplink frames 2590 and 2592 may be beamformed based on the beamforming information provided in the trigger frame 2588. In an aspect, the uplink frames 2590 and 2592 may be transmitted simultaneously by their respective station based on resource allocation information included in the trigger frame 2588. For instance, the uplink frames 2590 and 2592 may be multiplexed by UL MU OFDMA and/or UL MU-MIMO, such as in a PPDU 2594.

In an aspect, the AP may utilize the NDPA frame 1210 to collect information (e.g., channel state information, buffer status information, etc.) from the stations. After receiving MU NDP frames from the stations, the AP may transmit the trigger frame 2588 (which contains beamforming information to allow beamforming by the stations) to receive UL MU data from the stations. In an aspect, the information collected by the AP may be utilized by the AP to schedule sending of a trigger frame to cause UL MU transmission and/or determine resource allocation information for each station.

In one or more implementations, each station may utilize an NDP transmission (or lack of an NDP transmission) to implicitly indicate whether or not the station has data to send. The AP may send an NDP trigger frame (e.g., 1310) to the stations, where the NDP trigger frame contains resource allocation information for the stations. In an aspect, a station that receives the NDP trigger frame and has a UL data to send may send an NDP frame (e.g., 1012) using the resources assigned to the station in the NDP trigger frame. In an aspect, a station that receives the NDP trigger frame but does not have any UL data to send does not send an NDP frame in response to receiving the NDP trigger frame. The AP may determine whether or not a station has sent an NDP frame based on a detection mechanism algorithm (e.g., energy detection of assigned resources). The AP may interpret that a station does not have UL data to send if no NDP frame was received from the station.

In one or more implementations, an NDP frame format may be provided to facilitate collection of information (e.g., bit-wise information) such as buffer status information from stations. FIG. 27 illustrates an example of an NDP frame 2700. The description from FIG. 6 generally applies to FIG. 27, with examples of differences between FIG. 6 and FIG. 27 and other description provided herein for purposes of clarity and simplicity. The NDP frame 2700 may include an L-STF field, an L-LTF field, an L-SIG field, an RL-SIG field, an HE-SIG-A field, an HE-STF field, and an HE-LTF field(s). In an aspect, the AP may measure the UL channel through the HE-LTF symbols. The HE-LTF symbols may be associated with frequency/spatial multiplexing based on resource allocation information in a trigger frame (e.g., an NDP trigger frame). In an aspect, an HE-RSIG-A (HE-Repeated-SIG-A) field can be located between the HE-SIG-A field and HE-STF field for coverage extension.

FIG. 28 illustrates an example of an NDP frame 2800. The description from FIG. 27 generally applies to FIG. 28, with examples of differences between FIG. 27 and FIG. 28 and other description provided herein for purposes of clarity and simplicity. The NDP frame 2800 includes a Signature field that contains a signature symbol(s). The signature symbol(s) may be utilized by a station to transfer additional information to an AP in order to facilitate scheduling of a UL sounding protocol by the AP. The additional information may include buffer status information, power saving status of the station, etc.

In an aspect, the information contained in the Signature field may be information not related to a channel between the AP and the station. The channel-related information can be measured from the HE-LTF field(s), but the other information may be communicated by the stations to the AP. Inclusion of the information in the Signature field may reduce overhead, such as relative to a case in which another procedure (e.g., buffer status polling) is utilized to collect the information. In an aspect, an NDP trigger frame may include an indication regarding which UL MU NDP format is used (e.g., the UL MU NDP format with or without the Signature field). The NDP trigger frame can include multiple STA-specific information (e.g., multiple STA Info fields), which may contain, for instance, resource indices (e.g., associated with frequency, time, spatial stream, etc.) for signature multiplexing.

In one or more implementations, a pre-acquisition session may be utilized to facilitate an uplink sounding protocol. The pre-acquisition session may allow each station, which is a beamformer in the uplink sounding protocol, to initiate a sounding frame sequence, such as shown in FIG. 10. In an aspect, each beamformer (STA) does not have information about other beamformers (STAs) that may be known to the beamformee (AP). Therefore, for a UL sounding protocol, each station may utilize a pre-acquisition session to facilitate successful initiation of uplink sounding.

In some aspects, the beamformee (AP) may obtain information from the beamformers (STAs) prior to the UL sounding protocol to facilitate the UL sounding protocol. In this regard, the beamformee may utilize the information (e.g., preferred subband information, buffer status information) from the beamformers to determine resources to allocate to the beamformers.

The information for the pre-acquisition session can be in one or more of the following:
   Informed during association (e.g., if the information is static);
   Included (e.g., piggy-backed) in UL transmission prior to the UL sounding protocol;
   Included in UL request frames (e.g., 1642);

Included (e.g., piggy-backed) in an NDP frame. In an aspect, the NDP frame may include a small payload (e.g., a small HE-DATA field). In an aspect, the NDP frame may include a Signature field that can contain the information for the pre-association session.

In one or more aspects, UL sounding may be utilized when a station requests UL transmission but does not have sufficient information about the uplink channel. In an aspect, the station can include a sounding request in a UL request frame (e.g., 1642). Moreover, in an aspect, the station can include with the sounding request the number of antennas for beamforming.

In VHT-based sounding protocols, a beamformee may determine a subcarrier group Ng to be used in a beamforming feedback matrix V. Depending on the subcarrier group Ng and bandwidth, subcarrier tones for the feedback are provided in the IEEE 802.11ac specification:

A subcarrier group excludes pilot positions and direct current (DC) positions, while high throughput (HT) can send a CSI feedback in all data and pilot positions;

In the same subcarrier group Ng, the MU exclusive beamforming report (ΔSNR) has different subcarrier mapping from the beamforming report (e.g., compressed beamforming report).

Figure 29:
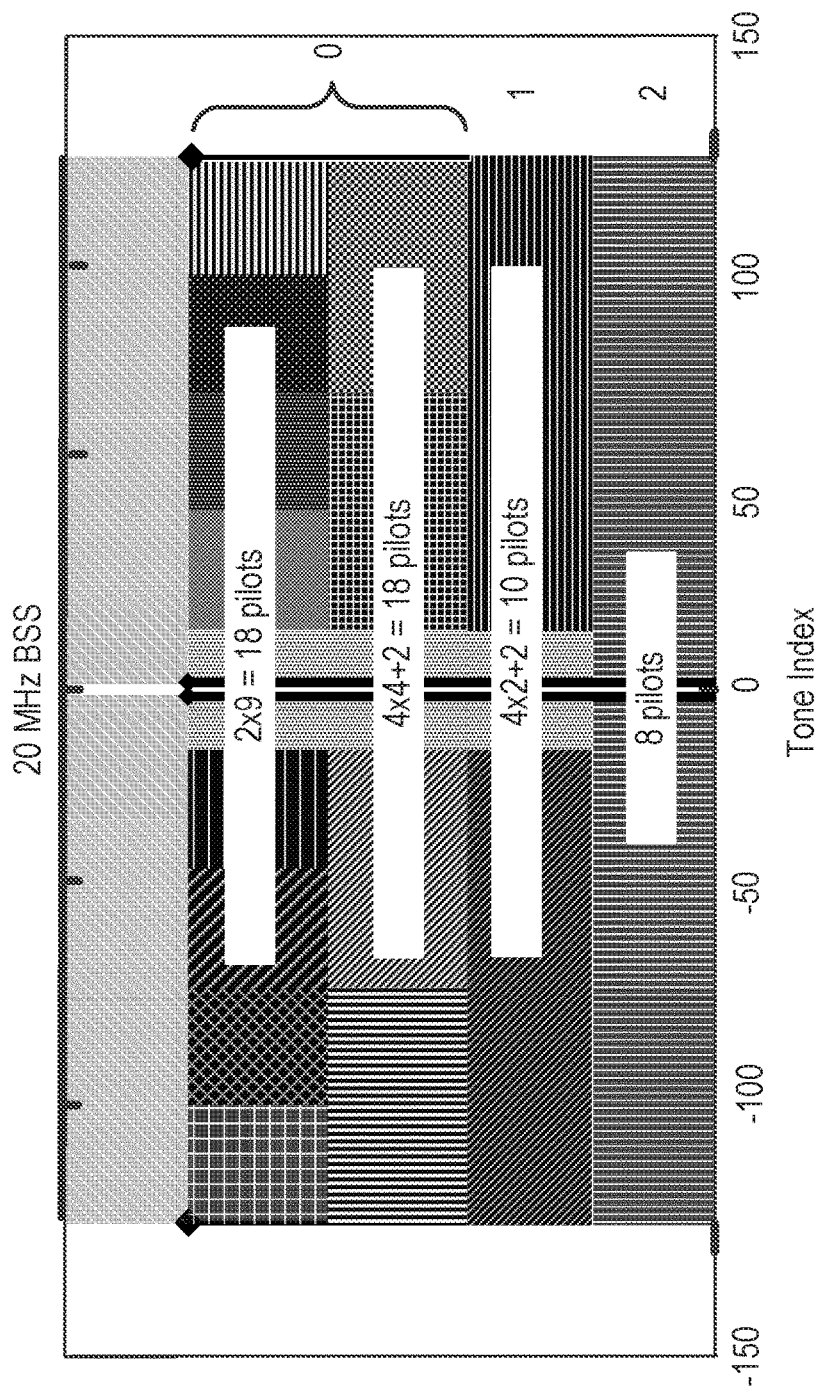
FIGS. 29, 30, and 31 illustrate examples of numbers of pilots in a 20 MHz, 40 MHz, and 80 MHz channel bandwidth numerology, respectively.
Figure 30:
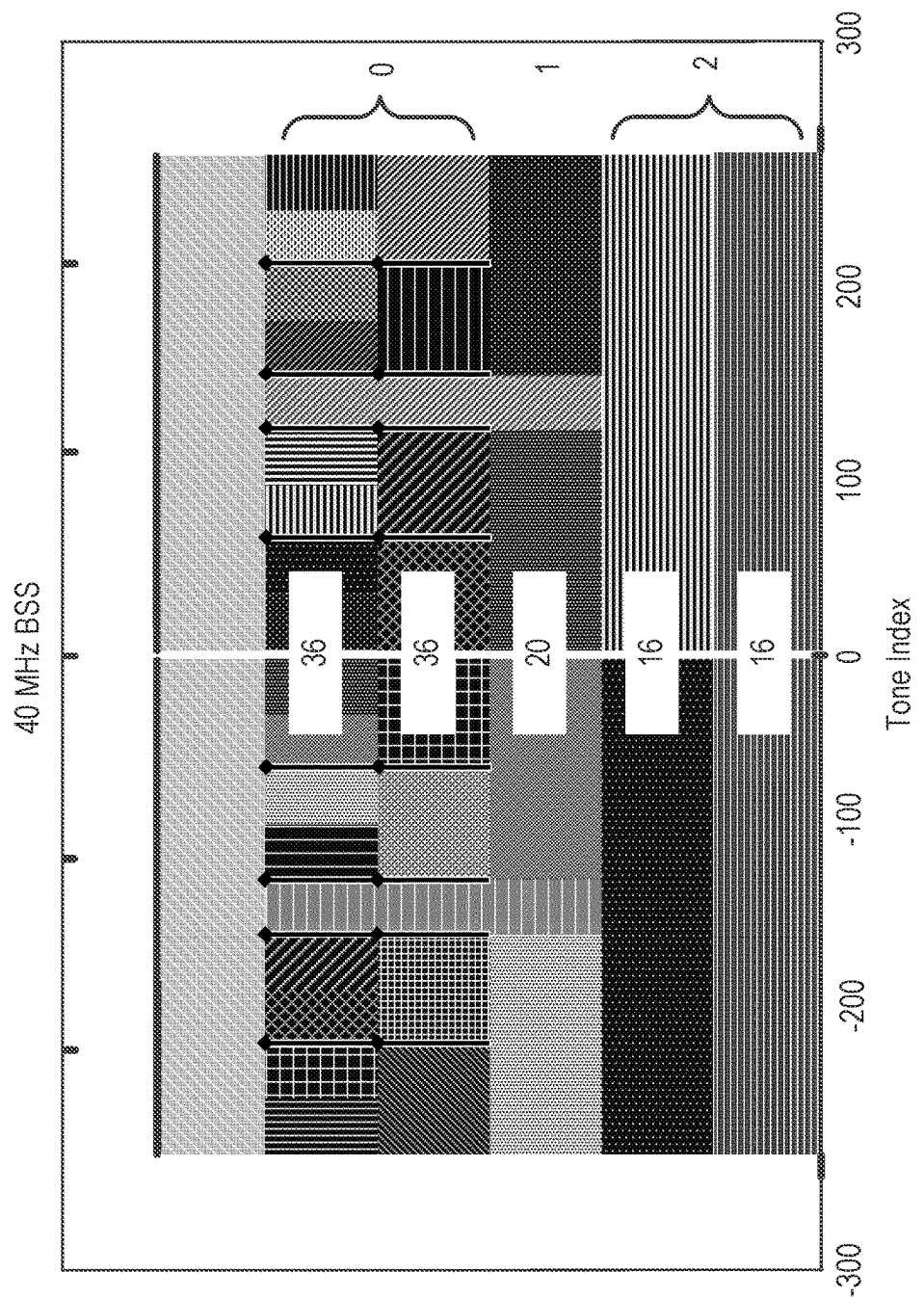
Figure 31:
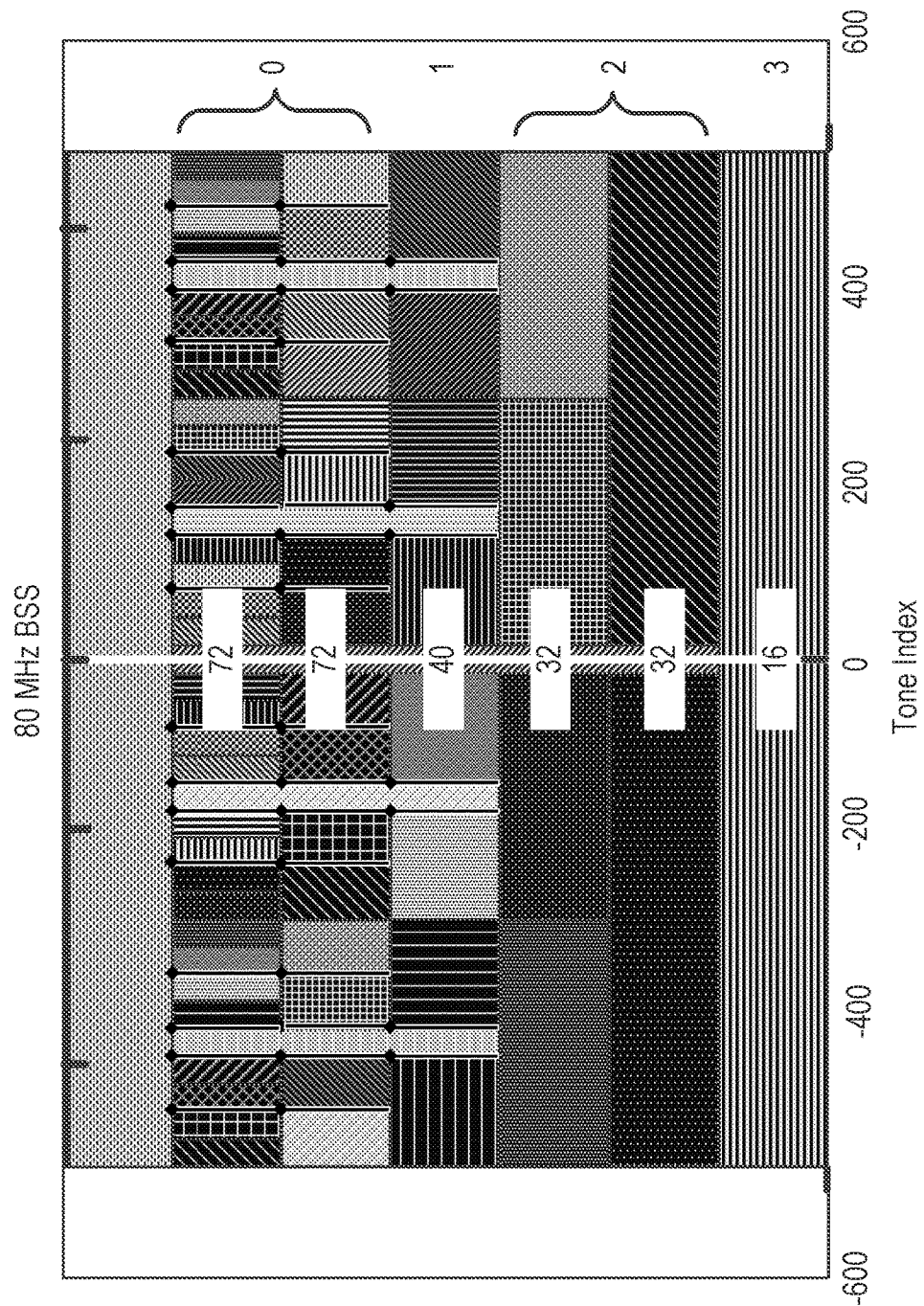

In an aspect, in HE OFDMA transmission, pilot tone positions in the frequency domain can be different depending on subblock configuration. FIGS. 29, 30, and 31 illustrate examples of numbers of pilots in a 20 MHz, 40 MHz, and 80 MHz channel bandwidth numerology, respectively. The numerology provides different manners by which to allocate resources for the channel bandwidth into individual resource units. For example, in FIG. 29, in a 20 MHz channel bandwidth, there may be 18, 10, or 8 pilots. In FIG. 30, in a 40 MHz channel bandwidth, there may be 36, 20, or 16 pilots. In FIG. 31, in an 80 MHz channel bandwidth, there may be 72, 40, 32, or 16 pilots.

In an aspect, for a given bandwidth (e.g., channel bandwidth), a beamformer may transmit an HE-LTF sequence in every tone position, including pilot tone positions, and each beamformee may determine subcarrier tones (e.g., data tone positions excluding pilot tone positions) for which to send feedback depending on a preferred subband size.

After sending an NDP frame with an HE-LTF sequence for the whole band (e.g., every tone position including pilot tone positions), the beamformer may receive feedback reports that include steering matrices. The feedback reports may include an indication of the reporting tone positions, excluding pilot tone positions, utilized in generating the feedback reports. After receiving an NDP frame, each beamformee may decide which subband configuration for feedback is used in a given bandwidth, calculate feedback matrices, and send an indication to allow the beamformer to know which tones are used for feedback.

The indication may be implemented as shown in FIGS. 29-31. In FIG. 29, for 20 MHz, the 26-tone basis (the first row) and the 52-tone basis (the second row) have the same number of pilots (e.g., 18 pilots). In an aspect, the positions of the pilots may be the same for the 26-tone basis and 52-tone basis. Therefore, the same indication state (e.g., state 0) can be shared for both. The 106-tone basis (e.g., associated with 10 pilots) and 242-tone basis (e.g., associated with 8 pilots) may have other indicate states (e.g., state 1 and state 2, respectively).

In FIG. 30, for 40 MHz, the 242-tone basis (the fourth row) and 484-tone basis (the fifth row) can share the same state (e.g., state 2) since the number of pilots (e.g., 16 pilots) is the same. In FIG. 31, for 80 MHz, the first and second rows (e.g., associated with 72 pilots each), and the fourth and the fifth rows (e.g., associated with 32 pilots each) can share their states similarly (e.g., state 0 and state 2, respectively).

Although the foregoing description generally provides examples of UL MU sounding protocols, the UL MU sounding protocols may also be applied in the single user case (e.g., one beamformer and one beamformee). Furthermore, the UL MU sounding protocols may involve fewer or more beamformers than explicitly described in the foregoing description and/or explicitly depicted in the figures. The horizontal dimension in FIGS. 7, 10-13, and 15-26 represents the time dimension. In some aspects, a time interval between any two frames in the foregoing description may be an SIFS, PIFS, or any other time interval (e.g., represented as xIFS).

The subject disclosure may be utilized in connection with "802.11ac-2013—IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz," published Dec. 18, 2013 (IEEE Standard), which is incorporated herein by reference in its entirety and includes, for example, IEEE Standard's Tables 8-53d, 8-53e, 8-53g, 8-53h, and 8-53j, which are referenced above in this disclosure.

It should be noted that like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

The embodiments provided herein have been described with reference to a wireless LAN system; however, it should be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Figure 32A:
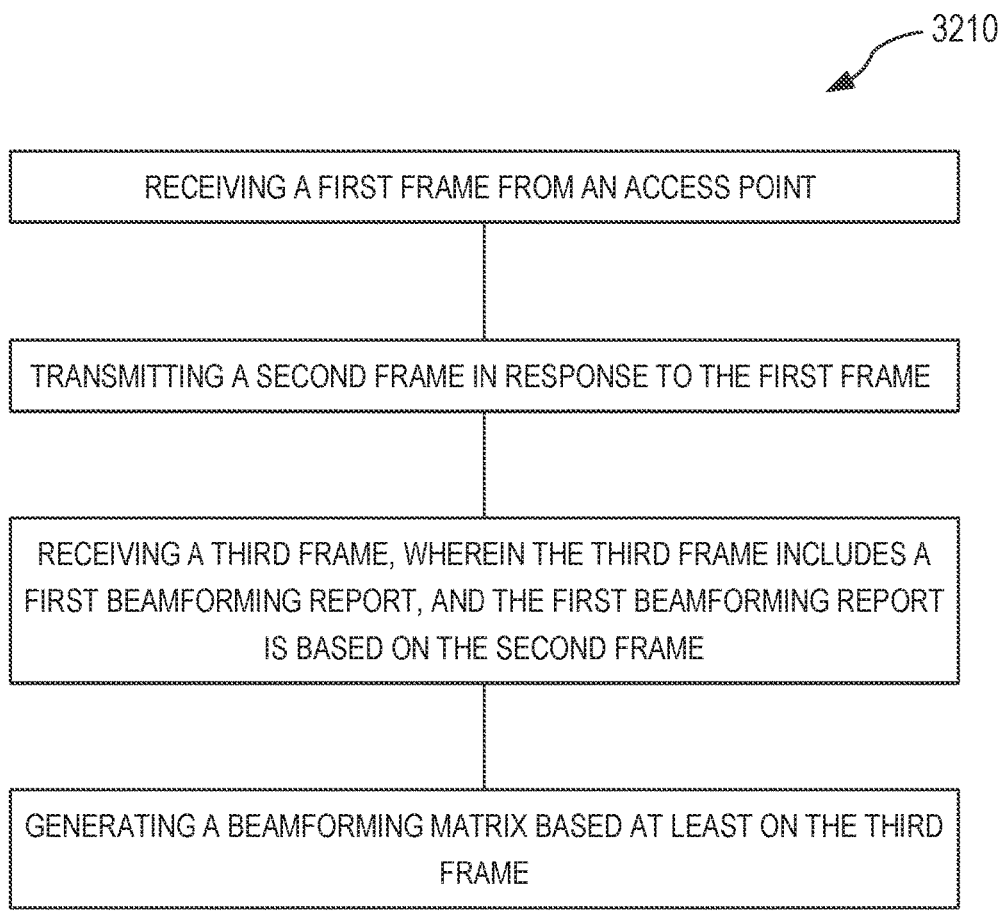
FIGS. 32A, 32B, and 32C illustrate flow charts of examples of methods for facilitating wireless communication for multi-user transmission.
Figure 32B:
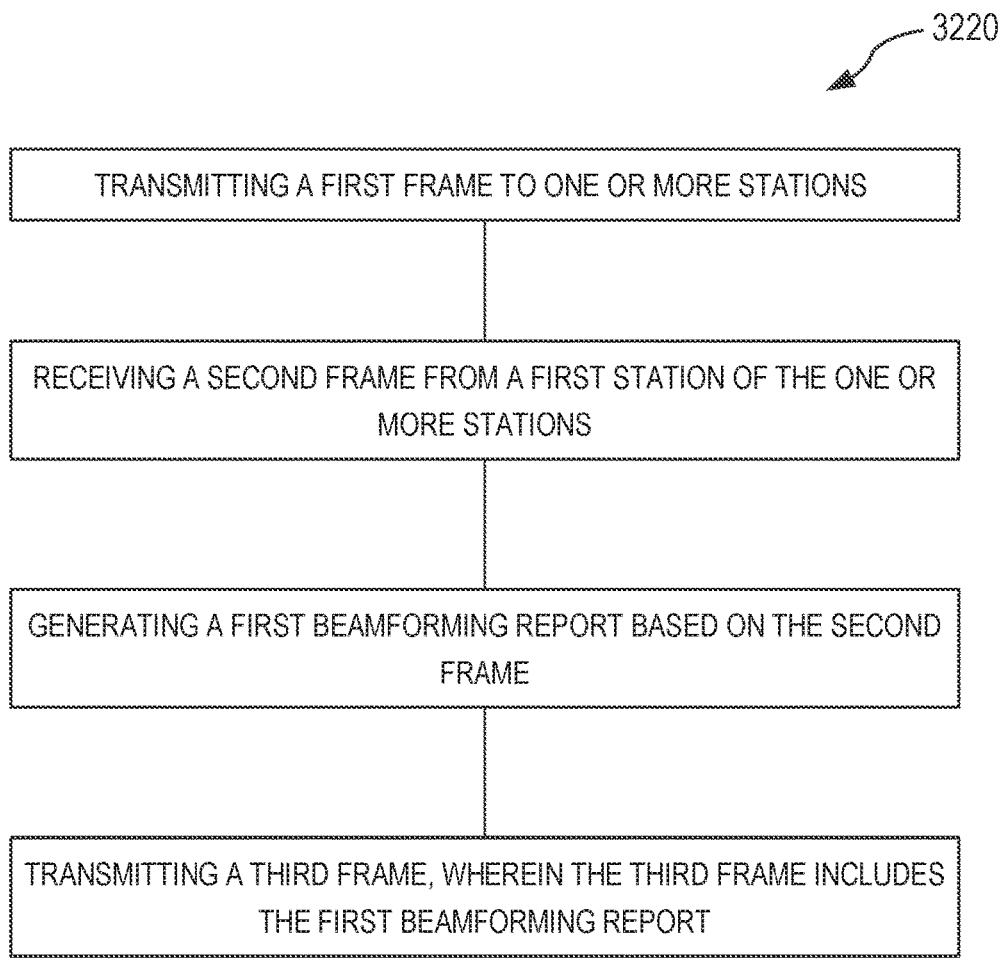
Figure 32C:
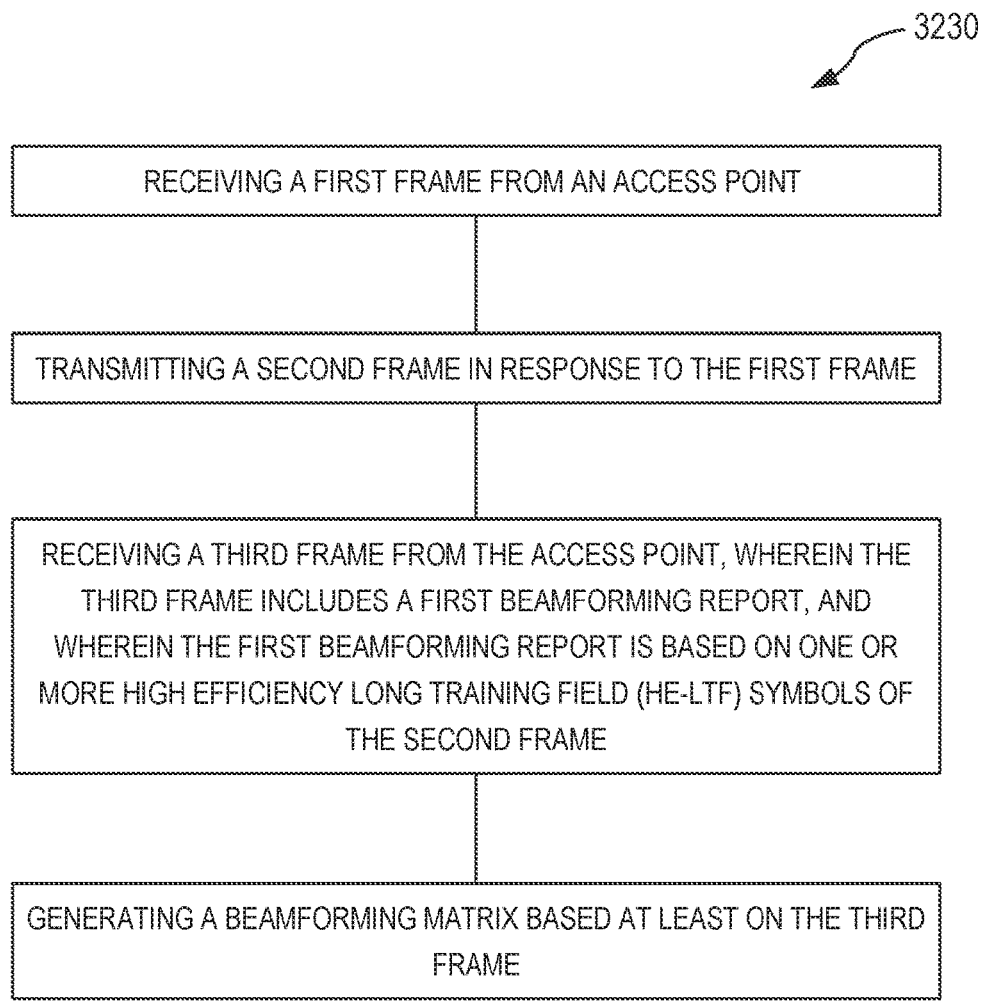

FIGS. 32A, 32B and 32C illustrate flow charts of examples of methods for facilitating wireless communication. For explanatory and illustration purposes, the example processes 3210, 3220 and 3230 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 3210, 3220 and 3230 are not limited to the wireless communication devices 111-115 of FIG. 1 or their components, and the example processes 3210, 3220 and 3230 may be performed by some of the devices shown in FIG. 1, or other devices or components. Further for explanatory and illustration purposes, the blocks of the example processes 3210, 3220 and 3230 are described herein as occurring in serial or linearly. However, multiple blocks of the example processes 3210, 3220 and 3230 may occur in parallel. In addition, the blocks of the example processes 3210, 3220 and 3230 need not be performed in the order shown and/or one or more of the blocks/actions of the example processes 3210, 3220 and 3230 need not be performed.

Various examples of aspects of the disclosure are described below as clauses for convenience. These are provided as examples, and do not limit the subject technology. As an example, some of the clauses described below are illustrated in FIGS. 32A, 32B and 32C.

Clause A. A station for facilitating communication in a wireless network for multi-user transmission, the station comprising: one or more memories; and one or more processors coupled to the one or more memories, the one or more processors configured to cause: receiving a first frame from an access point; transmitting a second frame in response to the first frame; receiving a third frame, wherein the third frame comprises a first beamforming report, and the first beamforming report is based on the second frame; and generating a beamforming matrix based at least on the third frame.

Clause B. An access point for facilitating communication in a wireless network for multi-user transmission, the access point comprising: one or more memories; and one or more processors coupled to the one or more memories, the one or more processors configured to cause: transmitting a first frame to one or more stations, receiving a second frame from a first station of the one or more stations; generating a first beamforming report based on the second frame; and transmitting a third frame, wherein the third frame comprises the first beamforming report.

Clause C. A computer-implemented method of facilitating communication in a wireless network for multi-user transmission, the method comprising: receiving a first frame from an access point; transmitting a second frame in response to the first frame; receiving a third frame from the access point, wherein the third frame comprises a first beamforming report, and wherein the first beamforming report is based on one or more high efficiency long training field (HE-LTF) symbols of the second frame; and generating a beamforming matrix based at least on the third frame.

In one or more aspects, additional clauses are described below.

A method comprising one or more methods or operations described herein.

An apparatus or a station comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus or a station comprising one or more memories (e.g., 240, one or more internal, external or remote memories, or one or more registers) and one or more processors (e.g., 210 or one or more portions), wherein the one or more memories store instructions that, when executed by the one or more processors, cause the one or more processors to perform one or more methods or operations described herein.

An apparatus or a station comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

A computer-readable storage medium (e.g., 240, one or more internal, external or remote memories, or one or more registers) storing instructions that, when executed by one or more processors (e.g., 210 or one or more portions), cause the one or more processors to perform one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A station for facilitating communication in a wireless network for multi-user transmission, the station comprising:
   one or more memories; and
   one or more processors coupled to the one or more memories, the one or more processors configured to cause:
      receiving a first frame from an access point;
      determining whether a length contained in the first frame exceeds a predetermined threshold length;
      generating a second frame that excludes a data field when the length contained in the first frame is determined not to exceed the predetermined threshold length;
      transmitting the second frame in response to the first frame;
      receiving a third frame, wherein the third frame comprises a first beamforming report, and the first beamforming report is based on the second frame, wherein the first beamforming report is received in a same frequency subband as that allocated for the second frame; and
      generating a beamforming matrix based at least on the third frame.

2. The station of claim 1, wherein the one or more processors are configured to cause:
   generating a beamformed data packet based on the beamforming matrix; and
   transmitting the beamformed data packet to the access point.

3. The station of claim 1, wherein:
   the third frame is a trigger frame; and
   the one or more processors are configured to cause transmitting a beamformed data packet to the access point in response to the trigger frame.

4. The station of claim 1, wherein the first frame indicates a first frequency bandwidth allocated to the station, and wherein a high efficiency long training field (HE-LTF) of the second frame occupies the first frequency bandwidth.

5. The station of claim 1, wherein the first frame is a trigger frame for facilitating an uplink multi-user transmission of null data packet (NDP) frames, and the second frame is an NDP frame.

6. The station of claim 1, wherein the first frame indicates whether the first frame is a trigger frame for causing transmission of NDP frames.

7. The station of claim 1, wherein the one or more processors are configured to cause determining that the first frame is a trigger frame for causing transmission of null data packet (NDP) frames based at least on a physical layer convergence protocol (PLCP) protocol data unit (PPDU) length contained in the first frame.

8. The station of claim 1, wherein the one or more processors are configured to cause transmitting a fourth frame to the access point, wherein the fourth frame comprises at least one of resource preference information or buffer status information associated with the station.

9. The station of claim 4, wherein:
the third frame further comprises a second beamforming report,
the first beamforming report is associated with the first frequency bandwidth, and
the second beamforming report is associated with a second frequency bandwidth.

10. The station of claim 9, wherein the fourth frame further comprises a request to the access point for transmission of the first frame.

11. An access point for facilitating communication in a wireless network for multi-user transmission, the access point comprising:
one or more memories; and
one or more processors coupled to the one or more memories, the one or more processors configured to cause:
transmitting a first frame to one or more stations;
receiving a second frame from a first station of the one or more stations, wherein the second frame excludes a data field based on a length contained in the first frame that does not exceed a predetermined threshold length;
generating a first beamforming report based on the second frame; and
transmitting a third frame, wherein the third frame comprises the first beamforming report, wherein the first beamforming report is transmitted in a same frequency subband as that allocated for the second frame.

12. The access point of claim 11, wherein the one or more processors are configured to cause:
transmitting a fourth frame to a second station of the one or more stations;
receiving a fifth frame from the second station;
generating a second beamforming report based on the fifth frame; and
transmitting a sixth frame, wherein the sixth frame comprises the second beamforming report.

13. The access point of claim 11, wherein:
the first frame comprises resource allocation,
the resource allocation comprises a first frequency bandwidth allocated to the first station and a second frequency bandwidth allocated to a second station,
a high efficiency long training field (HE-LTF) of the second frame occupies a bandwidth within the first frequency bandwidth, and
an HE-LTF of a fourth frame from the second station occupies a bandwidth within the second frequency bandwidth.

14. The access point of claim 11, wherein the one or more processors are configured to cause:
receiving a fourth frame from a second station of the one or more stations, and
wherein the first frame is a trigger frame for facilitating an uplink multi-user transmission of null data packet (NDP) frames, the second frame is a first NDP frame, and the fourth frame is a second NDP frame.

15. The access point of claim 11, wherein the first frame comprises an indication of whether the first frame is a trigger frame for causing transmission of NDP frames.

16. The access point of claim 11, wherein the third frame is a trigger frame, and
wherein the one or more processors are configured to cause:
receiving a fourth frame from the first station, wherein the fourth frame is beamformed based on the first beamforming report.

17. The access point of claim 11, wherein the one or more processors are configured to cause:
receiving a fourth frame from a second station of the one or more stations in response to the first frame; and
generating a second beamforming report based on the fourth frame,
wherein the third frame is a trigger frame that comprises the first beamforming report and the second beamforming report.

18. The access point of claim 11, wherein the one or more processors are configured to cause, prior to transmitting the first frame: receiving a fourth frame from the first station, wherein the fourth frame comprises at least one of resource preference information or buffer status information associated with the first station.

19. The access point of claim 12, wherein the one or more processors are configured to cause:
transmitting the first frame and transmitting the fourth frame to occur simultaneously, wherein the first frame and the fourth frame occupy different portions of a downlink channel bandwidth.

20. A computer-implemented method of facilitating communication in a wireless network for multi-user transmission, the method comprising:
receiving a first frame from an access point;
determining whether a length contained in the first frame exceeds a predetermined threshold length;
generating a second frame that excludes a data field when the length contained in the first frame is determined not to exceed the predetermined threshold length;
transmitting the second frame in response to the first frame;
receiving a third frame from the access point, wherein the third frame comprises a first beamforming report, and wherein the first beamforming report is based on one or more high efficiency long training field (HE-LTF) symbols of the second frame, wherein the first beamforming report is received in a same frequency subband as that allocated for the second frame; and
generating a beamforming matrix based at least on the third frame.

* * * * *